United States Patent
Nandhakumar et al.

(10) Patent No.: US 8,773,505 B2
(45) Date of Patent: Jul. 8, 2014

(54) BROADCAST RECEIVER AND 3D VIDEO DATA PROCESSING METHOD THEREOF

(75) Inventors: Nagaraj Nandhakumar, San Diego, CA (US); Jong Yeul Suh, Seoul (KR); Seung Jong Choi, Seoul (KR); Jin Seok Im, Seoul (KR); Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/258,963

(22) PCT Filed: Mar. 19, 2010

(86) PCT No.: PCT/KR2010/001710
§ 371 (c)(1),
(2), (4) Date: Sep. 22, 2011

(87) PCT Pub. No.: WO2010/126227
PCT Pub. Date: Nov. 4, 2010

(65) Prior Publication Data
US 2012/0033041 A1 Feb. 9, 2012

Related U.S. Application Data

(60) Provisional application No. 61/173,196, filed on Apr. 27, 2009, provisional application No. 61/173,588, filed on Apr. 28, 2009, provisional application No. 61/179,710, filed on May 19, 2009.

(51) Int. Cl.
*H04N 7/12* (2006.01)
*H04N 13/02* (2006.01)

(52) U.S. Cl.
CPC . *H04N 13/02* (2013.01); *H04N 7/12* (2013.01)
USPC ........................................ 348/43; 375/240.12

(58) Field of Classification Search
CPC ............ H04N 13/0055; H04N 19/00769; H04N 13/0239; H04N 13/0059; H04N 13/0048; H04N 5/50; H04N 7/12
USPC .......... 348/43, E13.075, E13.06, 569, 240.15; 725/62; 375/240.12–26
See application file for complete search history.

(56) References Cited

U.S. PATENT DOCUMENTS 5,083,851 A * 1/1992 MacDonald ................... 359/462
6,055,012 A 4/2000 Haskell et al.
(Continued)

FOREIGN PATENT DOCUMENTS

CN 1551636 A 12/2004
CN 1613263 A 5/2005
(Continued)

OTHER PUBLICATIONS

Tdvision Systems, Inc., "TDV CODEC—Enabling 3D HD video for massive adoption providing 2D compatibility", www.tdvision.com, Nov. 2008.

(Continued)

*Primary Examiner* — Dave Czekaj
*Assistant Examiner* — Dramos I Kalapodas
(74) *Attorney, Agent, or Firm* — McKenna Long & Aldridge LLP

(57) ABSTRACT

A broadcast receiver and a 3D video data processing method thereof are disclosed herein, a 3D video data processing method of a broadcast receiver according to an embodiment of the present invention includes receiving, by a receiving unit, a broadcast signal including 3D video data and 3D complementary video information, wherein the 3D video data include half-resolution base video data and complementary video data for configuring a full-resolution image; parsing, by 3D video information processing unit, a 3D complementary video information; decoding, by a base video decoder, the half-resolution base video data; decoding, by a complementary video decoder, the complementary video data for configuring a full-resolution image; and combining and formatting, by an output formatter, the base video data and the complementary video data using the 3D complementary video information, thereby outputting a full-resolution 3D image.

10 Claims, 20 Drawing Sheets

(56) References Cited

U.S. PATENT DOCUMENTS

| | | | |
|---|---|---|---|
| 6,057,884 A | | 5/2000 | Chen et al. |
| 2007/0041442 A1* | | 2/2007 | Novelo ............... 375/240.12 |
| 2007/0230566 A1* | | 10/2007 | Eleftheriadis et al. ..... 375/240.1 |
| 2008/0089412 A1 | | 4/2008 | Ugur et al. |
| 2010/0045780 A1* | | 2/2010 | Kwon et al. ............... 348/51 |
| 2012/0019619 A1* | | 1/2012 | Suh et al. ................ 348/43 |

FOREIGN PATENT DOCUMENTS

| | | |
|---|---|---|
| CN | 1926576 A | 3/2007 |
| CN | 1954606 A | 4/2007 |
| CN | 101188779 A | 5/2008 |
| CN | 102484729 A | 5/2012 |
| EP | 1727091 | 11/2006 |
| WO | WO 2006/104326 A1 | 10/2006 |

OTHER PUBLICATIONS

Tdvision Systems Inc., "TDV CODEC—Enabling 3D HD video for massive adoption at the best quality providing 2D compatibility", www.tdvision.com. Nov. 2008.

She-Chan Oh et al: "Scalable Video Coding for Vision Based Subway Platform Monitoring System", SICE-ICCAS 2006 International Joint Conference, IEEE, Piscataway, NJ, USA, Oct. 1, 2006, pp. 1539-1542, XP031051017, ISBN:978-89-950038-4-8 *the whole document*.

Yo-Sung Ho et al: "Overview of Multi-view Video Coding", Systems, Signals and Image Processing, 2007 and 6th EURASIP Conference Focused on Speech and Image Processing, Multimedia Communicaitons and Services, IEEE,PI, Jun. 1, 2007, pp. 5-12, XP031159489, ISBN:978-961-248-036-3 *the whole document*.

Jens-Uwe Garbas et al: "Wavelet-based multi-view video coding with full scalability and illumination compensation", Proceedings of the 15th international conference on Multimedia, Multimedia '07, Sep. 28, 2007, XP055057804, New York, New York, USA DOI: 10.1145/1291233.1291402 ISBN:978-1-59-593702-5 Retrieved from the Internet: *the whole document*.

Jongryool Kim et al: "Real-timesynchronous multi-view video transport system over IP networks", IEEE Transactions on Consumer Electronics, IEEE Service Center, New York, NY, US, vol. 5, No. 2, May 1, 2008, pp. 460-467, XP011229920, ISSN:0098-3063,DOI: 10.1109/TCE.2008.4560115 *the whole document*.

Kiyoung Lee: "Software-based realization of secure stereoscopic HD video delivery over IP networks," Proceedings of SPIE, vol. 6016, Jan. 1, 2005, p. 601604, XP055022561, ISSN:0277-786X,DOI:10.1117/12.630151 *the whole document*.

\* cited by examiner

Fig. 5
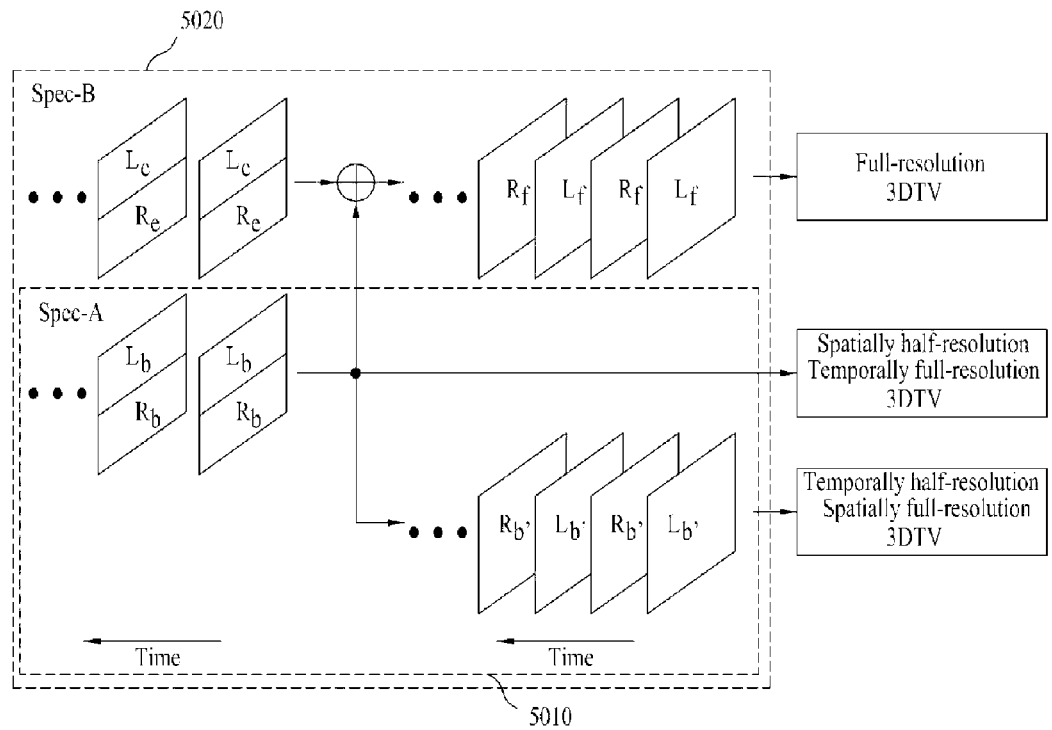
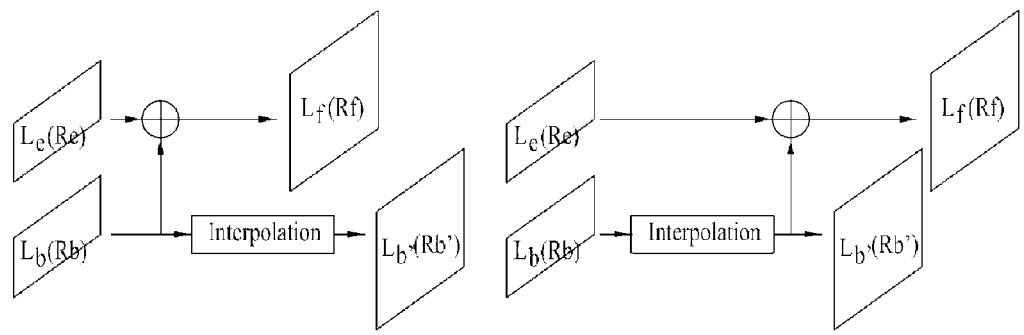

Fig. 6
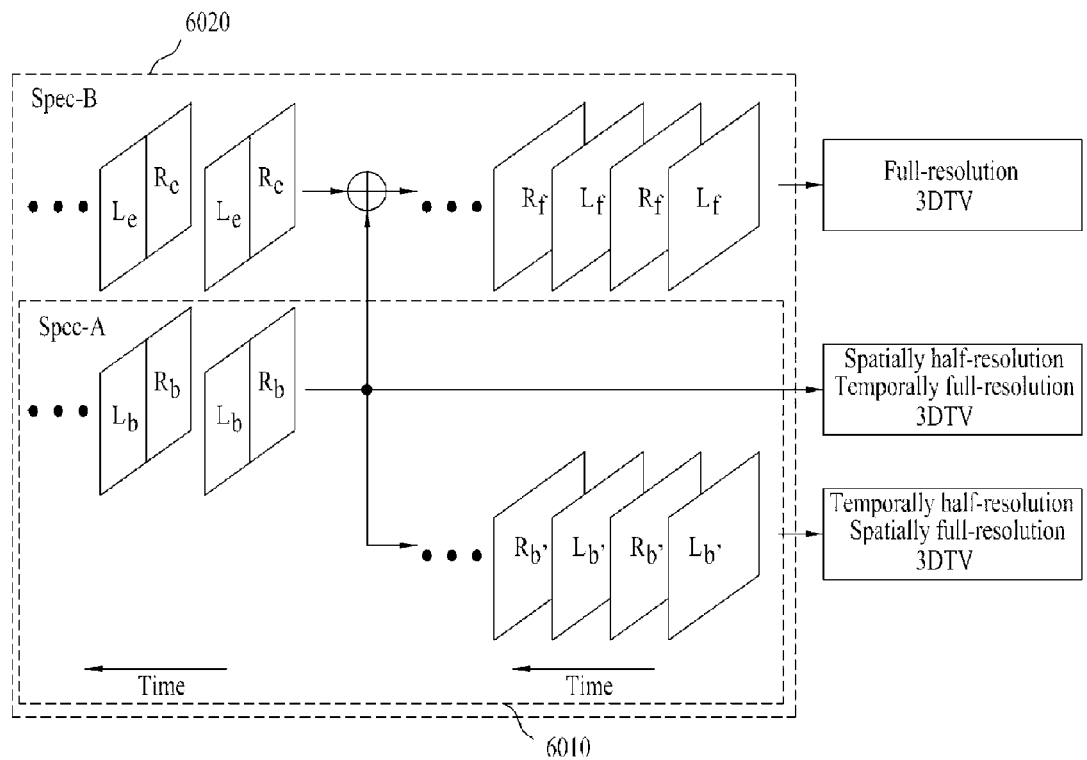
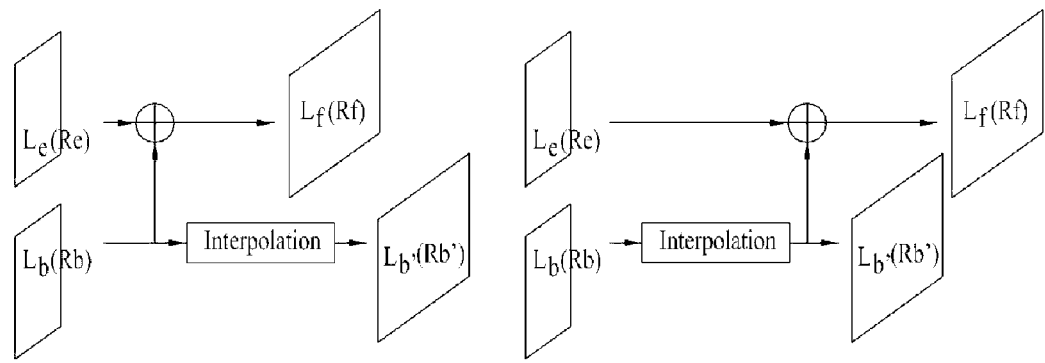

Fig. 8

| Syntax | No. of Bits | Format |
|---|---|---|
| terrestral_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i < N; i++) { | | |
|       descriptor() | | |
|     } | | |
|   } | | |
|   reserved | 6 | '111111' |
|   additional_descriptors_length | 10 | uimsbf |
|   for (j=0; j < N; j++) { | | |
|     additional_descriptor() | | |
|   } | | |
|   CRC_32 | 32 | rpchof |
| } | | |

8010 — service_type: indicates 3D service 2.0 (Signals details on whether video data supporting Spec-B are included)

8020 — descriptor(): includes information on a complementary video component configuring a 3DTV service corresponding to Spec-B

Fig. 9

| Syntax | No. of bits | Format |
|---|---|---|
| 3D_complementary_video_descriptor_VCT ( ) { | | |
|     descriptor_tag | 8 | 0xTBD |
|     descriptor_length | 8 | uimsbf |
|     reserved | 3 | '111' |
|     PCR_PID | 13 | uimsbf |
|     reserved | 1 | '1' |
|     number_elements | 7 | uimsbf |
|     for (j=0; j < number_elements; j++) { | | |
|         reserved | 3 | '111' |
|         elementary_PID | 13 | uimsbf |
|         complementary_type | 7 | uimsbf |
|         naive_subsampling_flag | 1 | bslbf |
|         codec_type | 8 | uimsbf |
|         horizontal_size | 16 | uimsbf |
|         vertical_size | 16 | uimsbf |
|         frame_rate | 16 | uimsbf |
|         reserved | 5 | '11111' |
|         interpolation_filter_available_flag | 1 | uimsbf |
|         left_image_first_flag | 1 | bslbf |
|         complementary_first_flag | 1 | bslbf |
|     } | | |
| } | | |

Fig. 10

Meanings according to values of the Complementary_type field

| Value | Description |
|---|---|
| 0 | Line interleaving – complementary video carries complementary line data.<br>Depending on the value of complementary_first_flag, complementary video contains either even lines or odd lines part of the full resolution video frame while base video contain complementary lines.<br>Whether the line interleaving is done horizontally or vertically depends on the multiplexing type of the base video. (Side-by-Side will require vertical interleaving while Top-Bottom will require horizontal interleaving) |
| 1 | Pixel interleaving, order alternating between lines – complementary video carries every other pixel of the full resolution image.<br>Full resolution image will be constructed by interleaving base and complementary video by pixel-by-pixel basis.<br>The order of interleaving pixels will be changed between lines. (if order is fixed, it will be same as the vertical line interleaving)<br>The value of complementary_first_flag will tell which video component contains the first pixel of the reconstructed full resolution image. |
| 2 | Frame interleaving – complementary video carries every other frame of the full resolution image. (full resolution in terms of temporal resolution)<br>Full resolution image will be constructed by interleaving base and complementary video by frame-by-frame basis.<br>The value of complementary_first_flag will tell whether a frame from the complementary video component will be placed before or after the corresponding frame from the base video component. |
| 3 | Field interleaving – complementary video carries every other field of the full resolution image. (full resolution in terms of temporal resolution)<br>Full resolution image will be constructed by interleaving base and complementary video by field-by-field basis.<br>The value of complementary_first_flag will tell whether the complementary video component contains even or odd field of the full resolution image |
| 4 | Complementary video carries residual or incremental data.<br>Regardless of stereo-multiplexing format of the base video component, the complementary video component carries the residual or incremental data at the full resolution.<br>Thus it is required that the base video component be interpolated and doubled before combining it with the complementary video component data. |

Fig. 11

| Syntax | No. of Bits | Mnemonic |
|---|---|---|
| TS_program_map_section() { | | |
|     table_id | 8 | uimsbf |
|     section_syntax_indicator | 1 | bslbf |
|     '0' | 1 | bslbf |
|     reserved | 2 | bslbf |
|     section_length | 12 | uimsbf |
|     program_number | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved | 3 | bslbf |
|     PCR_PID | 13 | uimsbf |
|     reserved | 4 | bslbf |
|     program_info_length | 12 | uimsbf |
|     for (i=0; i< N; i++) { | | |
|         descriptor() | | |
|     } | | |
|     for (i=0; i< N; i++) { | | |
|         stream_type | 8 | uimsbf |
|         reserved | 3 | bslbf |
|         elementary_PID | 13 | uimsbf |
|         reserved | 4 | bslbf |
|         ES_info_length | 12 | uimsbf |
|         for (i=0; i< N2; i++) { | | |
|             descriptor() | | |
|         } | | |
|     } | | |
|     CRC_32 | 32 | rpchof |
| } | | |

11010 location of 3D_complementary_video_descriptor_PMT

Fig. 12

| Syntax | No. of bits | Format |
|---|---|---|
| 3D_complementary_video_descriptor_PMT ( ) { | | |
| descriptor_tag | 8 | 0xTBD |
| descriptor_length | 8 | uimsbf |
| complementary_type | 7 | uimsbf |
| native_subsampling_flag | 1 | bslbf |
| codec_type | 8 | uimsbf |
| horizontal_size | 16 | uimsbf |
| vertical_size | 16 | uimsbf |
| frame_rate | 16 | uimsbf |
| reserved | 5 | '11111' |
| interpolation_filter_available_flag | 1 | uimsbf |
| left_image_first_flag | 1 | bslbf |
| complementary_first_flag | 1 | bslbf |
| } | | |

Fig. 14

| Syntax | No. of bits | Format |
|---|---|---|
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

Fig. 15

| Syntax | No. of bits | Format |
|---|---|---|
| Complementary_video_info ( ) { | | |
|     complementary_type | 7 | uimsbf |
|     native_subsampling_flag | 1 | bslbf |
|     codec_type | 8 | uimsbf |
|     horizontal_size | 16 | uimsbf |
|     vertical_size | 16 | uimsbf |
|     frame_rate | 16 | uimsbf |
|     reserved | 5 | '11111' |
|     interpolation_filter_available_flag | 1 | uimsbf |
|     left_image_first_flag | 1 | bslbf |
|     complementary_first_flag | 1 | bslbf |
| } | | |

Fig. 16
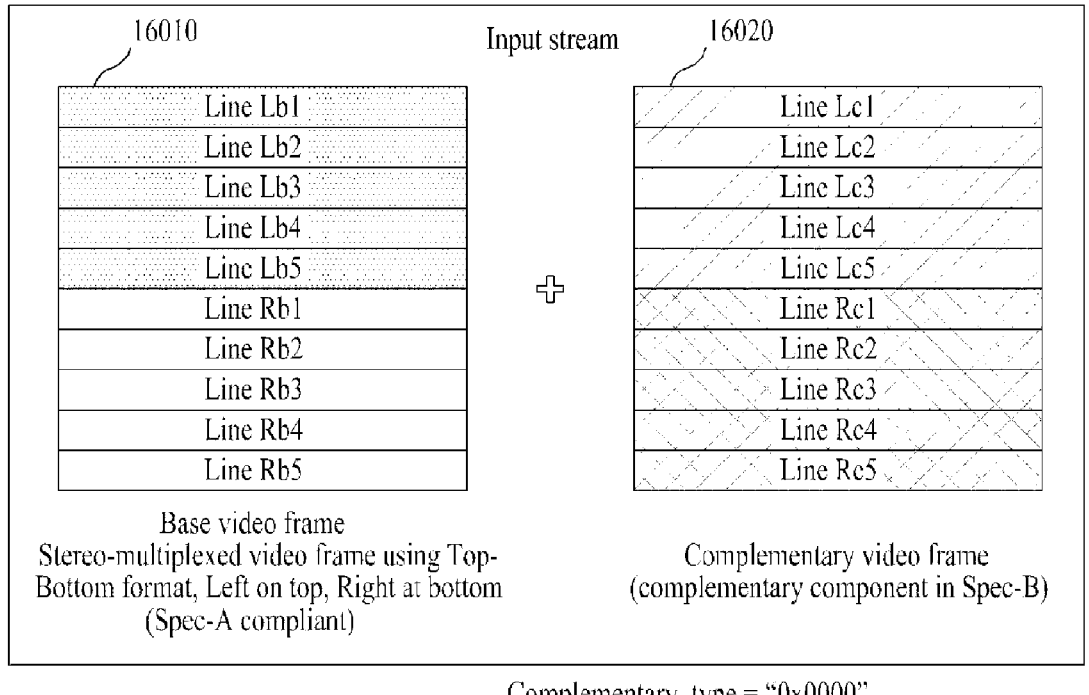
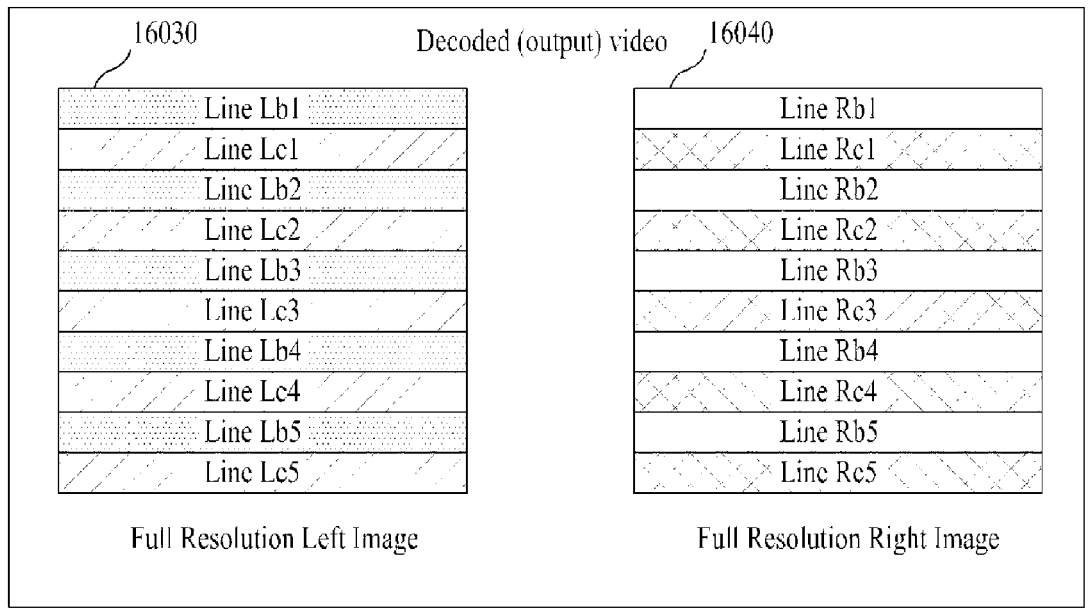

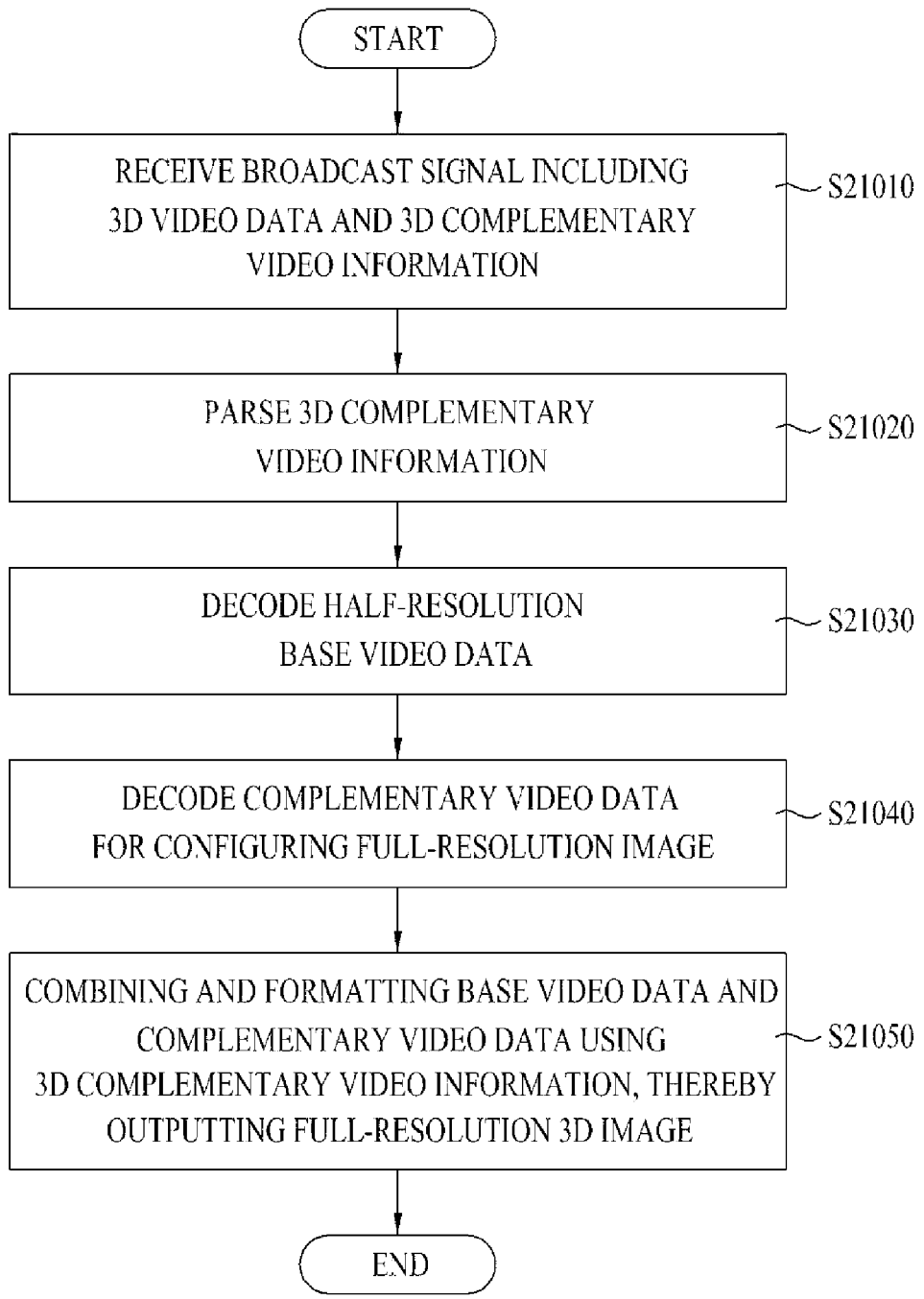

BROADCAST RECEIVER AND 3D VIDEO DATA PROCESSING METHOD THEREOF

This application is a National Stage Entry of International Application No. PCT/KR2010/001710, filed on Mar. 19, 2010, and claims the benefit of U.S. Provisional Application Nos. 61/173,196, filed Apr. 27, 2009, 61/173,588, filed Apr. 28, 2009 and 61/179,710, filed May 19, 2009, all of which are hereby incorporated by reference for all purposes as if fully set forth herein in their entireties.

TECHNICAL FIELD

The present invention relates to a device and method for processing broadcast signals and, more particularly, to a broadcast receiver processing video data of full-resolution in a 3D broadcasting system and a 3D video data processing method thereof.

BACKGROUND ART

Generally, a 3-dimensions (3D) image (or stereoscopic image) provides a cubic effect by using the principles of stereoscopic vision of both human eyes. A human being (or individual) senses perspective through a parallax between both eyes, in other words, a binocular parallax caused by the two eyes of an individual being spaced apart at a distance of approximately 65 millimeters (mm). Therefore, a 3D image may provide a cubic effect and perspective by providing an image enabling and a flat image associated with both the left eye and the right eye to be viewed.

Methods for displaying such 3D image include a stereoscopic method, a volumetric method, a holographic method, and so on. In case of the stereoscopic method, a left view image that is to be viewed by the left eye and a right view image that is to be viewed by the right eye are provided, and each of the left eye and the right eye respectively views the left view image and the right view image through polarized glasses or through a display equipment, thereby enabling the viewer to acknowledge the 3D effect.

DISCLOSURE OF INVENTION

Technical Problem

An object of the present invention devised to solve the problem lies on providing a more convenient and efficient broadcasting environment to the user by transmitting and receiving information of 3D video data, when a 3D broadcasting system transmits a video stream for a stereoscopic display, and by using the information to process the 3D video data.

Solution to Problem

In order to achieve the object of the present invention, a 3D video data processing method of a broadcast receiver according to an embodiment of the present invention includes receiving, by a receiving unit, a broadcast signal including 3D video data and 3D complementary video information, wherein the 3D video data include half-resolution base video data and complementary video data for configuring a full-resolution image; parsing, by 3D video information processing unit, the 3D complementary video information; decoding, by a base video decoder, the half-resolution base video data; decoding, by a complementary video decoder, the complementary video data for configuring a full-resolution image; and combining and formatting, by an output formatter, the base video data and the complementary video data using the 3D complementary video information, thereby outputting a full-resolution 3D image.

Additionally, a broadcast receiver according to an embodiment of the present invention includes a receiving unit receiving a broadcast signal including 3D video data and 3D complementary video information, wherein the 3D video data include half-resolution base video data and complementary video data for configuring a full-resolution image; a 3D video information processing unit parsing the 3D complementary video information; a base video decoder decoding the half-resolution base video data; a complementary video decoder decoding the complementary video data for configuring a full-resolution image; and an output formatter combining and formatting the base video data and the complementary video data using the 3D complementary video information, thereby outputting a full-resolution 3D image.

Advantageous Effects of Invention

According to the present invention, when providing a 3D broadcast service, a receiver may process the received 3D video data so that the 3D effect intended at the point of production of the 3D broadcast service can be reflected.

According to the present invention, a full-resolution 3D broadcast service may be provided while minimizing the influence on the conventional 2D broadcast services and the half-resolution 3D broadcast services.

BRIEF DESCRIPTION OF DRAWINGS

FIG. 5 illustrates a method for providing a 3D broadcast service according to another embodiment of the present invention.

FIG. 6 illustrates a method for providing a 3D broadcast service according to another embodiment of the present invention.

FIG. 8 illustrates a syntax structure of a TVCT including 3D complementary video information according to an embodiment of the present invention.

FIG. 9 illustrates a syntax structure of a 3D complementary video descriptor included in a TVCT according to an embodiment of the present invention.

FIG. 10 illustrates an image configuration method according to a field value of a complementary_type field included in 3D complementary video information according to an embodiment of the present invention.

FIG. 11 illustrates a syntax structure of a PMT including 3D complementary video information according to an embodiment of the present invention.

FIG. 12 illustrates a syntax structure of a 3D complementary video descriptor included in a PMT according to an embodiment of the present invention.

FIG. 14 illustrates a syntax structure when 3D complementary video information is included in an SEI (Supplemental Enhancement Information) message of a video ES and transmitted according to an embodiment of the present invention.

FIG. 15 illustrates a syntax structure of 3D complementary video information being included and transmitted in a complementary video ES according to an embodiment of the present invention.

FIG. 16 illustrates a method for providing a full-resolution image using base video data, complementary video data, and 3D complementary video information received from a 3D video service Spec-B according to an embodiment of the present invention.

FIG. 21 illustrates a flow chart showing a 3D video data processing method of a broadcast receiver according to an embodiment of the present invention.

BEST MODE FOR CARRYING OUT THE INVENTION

Figure 1:
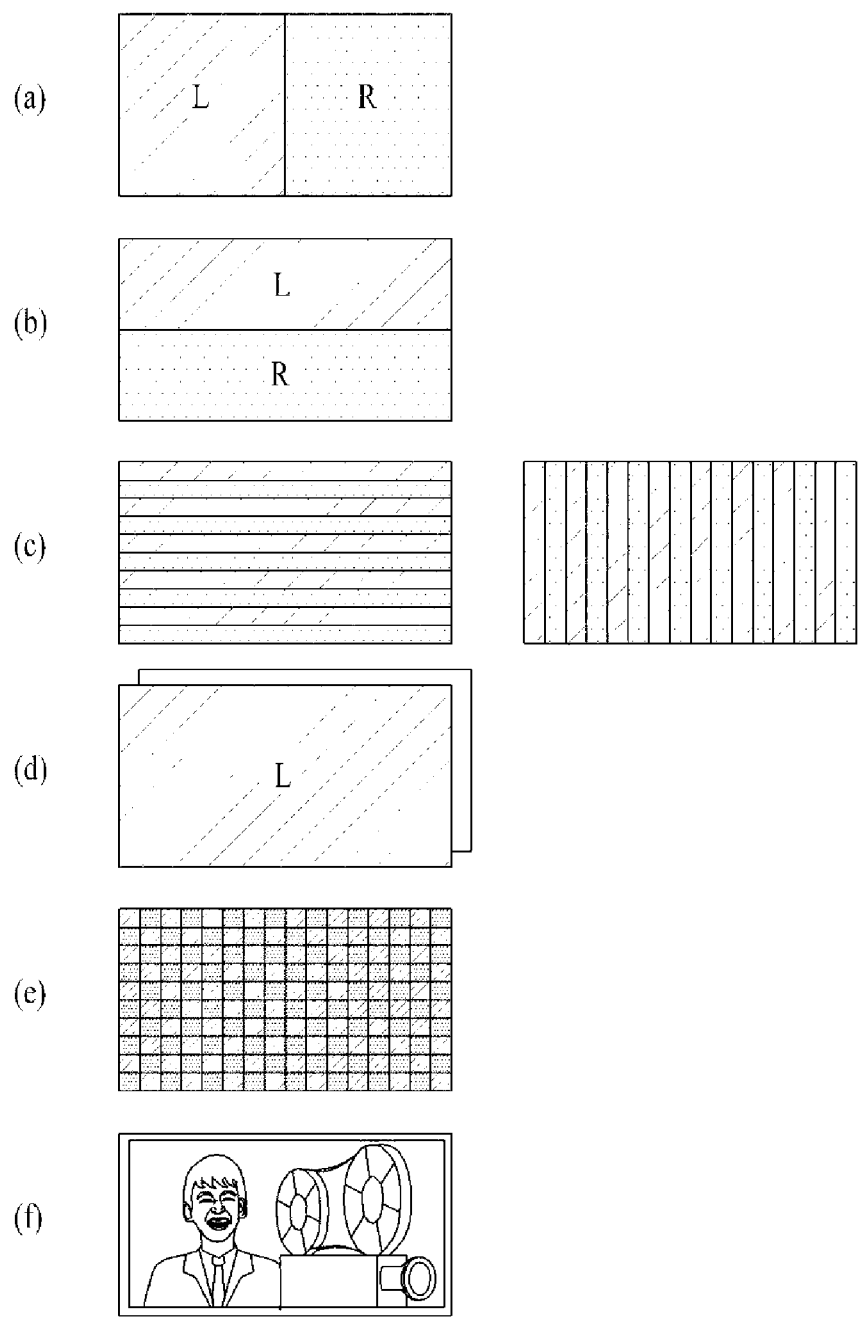
FIG. 1 shows a stereoscopic image multiplexing format of a variety of image formats according to an embodiment of the present invention.

The preferred embodiments of the present invention will now be described in detail with reference to the accompanying drawings and the details given in the accompanying drawings. However, the present invention will not be limited only to the preferred embodiments described herein.

Although the terms used in the present invention are selected from generally known and used terms, some of the terms mentioned in the description of the present invention may be varied by anyone skilled in the art at his or her discretion, according to custom, or due to the advent of new technologies. Also, in some cases, some of the terms mentioned in the description of the present invention have been selected by the applicant at his or her discretion. And, in these cases, the detailed meanings are described in relevant parts of the description presented herein. Therefore, it is required that the terms used in the description of the present invention is understood not simply by the mere naming of the terms used herein but by the actual meaning of each term lying within and, also, based upon the overall content of the description of the present invention.

3D image presentation methods include a stereoscopic image method, which takes into account two perspectives (or viewpoints), and a multiple view image method, which takes into account three or more perspectives (or viewpoints). Conversely, the related art single view image type may be referred to as a monoscopic method.

A stereoscopic image method uses a left/right pair of images acquired by photographing the same subject with a left-side camera and a right-side camera, wherein both cameras are spaced apart from one another at a predetermined distance. A multi-view image uses a set of at least 3 images acquired by photographing with at least 3 different cameras either spaced apart from one another at predetermined distances or placed at different angles. Hereinafter, although the stereoscopic method will be described according to an embodiment of the present invention, the ideas of the present invention may also be applied to the multi-view method. Also, hereinafter, the term stereoscopic may also be shortened to stereo.

The stereoscopic image or the multi-view image may be compression encoded in an MPEG (Moving Picture Experts Group) format or by using diverse methods, thereby being transmitted.

For example, a stereoscopic image or a multi-view image may be compression-encoded by using an H.264/AVC (Advanced Video Coding) method, thereby being transmitted. At this point, the receiving system performs a decoding process on the received image as an inverse process for the H.264/AVC method, thereby acquiring a 3D image.

Furthermore, any one of the left view image or the right view image of the stereoscopic image or any one image of the multi-view image may be assigned as a base layer image, and the remaining image may be assigned as an enhancement layer image. Thereafter, the image of the base layer may be encoded by using the same method used for encoding a monoscopic image. And, in the image of the enhancement layer, only the relation information between the base layer image and the enhancement layer image may be encoded. Then, the processed images may be transmitted. Examples of the compression-encoding methods for the base layer image may include JPEG, MPEG-1, MPEG-2, MPEG-4, and H.264/AVC. And, in this embodiment of the present invention, the H.264/AVC method has been adopted. Furthermore, according to the embodiment of the present invention, the H.264/SVC (Scalable Video Coding) or MVC (Multi-view Video Coding) method has been adopted for the compression-encoding process of the enhancement layer image.

The conventional standard for groundwave (or terrestrial) DTV transmission and reception is based upon 2D video content. Accordingly, in order to service 3D TV broadcast content, a transmission and reception standard for 3D TV broadcast content should be additionally defined. A receiver may receive a broadcast signal in accordance with the added transmission and reception standard, so as to adequately process the received signal, thereby supporting a 3D broadcast service.

In the description of the present invention, the ATSC (Advanced Television Systems Committee) standard will be used to describe the conventional DTV transmission and reception standard according to the embodiment of the present invention.

In case of the ATSC system, information for processing a broadcast content may be included in the system information, thereby being transmitted.

The system information may, for example, be referred to as service information. Herein, for example, the system information may include channel information, program information, event information, and so on. In case of the ATSC standard method, the system information may be transmitted and received by being included in a PSI/PSIP (Program Specific Information/Program and System Information Protocol). However, the present invention will not be limited only to this example. And, in case of a protocol transmitting the system information in a table format, the protocol may be applied to the present invention regardless of its term (or name).

According to an embodiment of the present invention, the PSI table may include a PAT (Program Association Table), and a PMT (Program Map Table).

The PAT corresponds to special information that is transmitted by a data packet having a PID of '0'. The PAT may transmit PID information of the corresponding PMT for each program. The PMT transmits PID information of a transport stream (TS) packet, in which program identification numbers and individual bit sequences of video and audio data configuring the corresponding program are transmitted, and also transmits the PID information in which PCR is transmitted. Then, by parsing the PMT acquired from the PAT, the correlation information between the elements configuring the corresponding program may also be acquired.

According to an embodiment of the present invention, the PSIP table may include a VCT (Virtual Channel Table), an STT (System Time Table), an RRT (Rating Region Table), an ETT (Extended Text Table), a DCCT (Direct Channel Change Table), a DDCSCT (Direct Channel Change Selection Code Table), an EIT (Event Information Table), and an MGT (Master Guide Table).

The VCT may transmit information on virtual channels, such as channel information for selecting channels and information such as PIDs (Packet Identifiers) for receiving the audio and/or video data. More specifically, when the VCT is parsed, the PID of the audio/video data of the broadcast program, which is carried through the channel along with the channel name and the channel number, may be acquired. The STT may transmit information on the current data and timing information, and the RRT may transmit information on region and consultation organs for program ratings. The ETT may transmit additional description of a specific channel and broadcast program, and the EIT may transmit information on virtual channel events. The DCCT/DCCSCT may transmit information associated with automatic (or direct) channel change, and the MGT may transmit the version and PID information of each table within the PSIP.

The transmission format of the stereoscopic image includes a single video stream format and a multi-video stream format. The single video stream format corresponds to a method of multiplexing video data of two perspectives into a single video stream and transmitting the single video stream. Herein, since video data are transmitted to one video stream, the single video stream format is advantageous in that a bandwidth being additionally required for providing a 3D broadcast service is not broad. The multi-video stream format corresponds to a method of transmitting multiple video data to multiple video streams. Herein, although the usage of the bandwidth increases, since high capacity data can be transmitted, the multi-video stream format is advantageous in that high picture quality video data can be displayed.

FIG. 1 shows a stereoscopic image multiplexing format of a variety of image formats according to an embodiment of the present invention.

The image formats of a 3D broadcast service include a side-by-side format shown in (a), a top-bottom format shown in (b), an interlaced format shown in (c), a frame sequential format shown in (d), a checker board format shown in (e), and an anaglyph format shown in (f).

The side-by-side format shown in (a) corresponds to a format, wherein a left image and a right image are ½ down-sampled in a horizontal direction. Herein, one of the sampled images is positioned on the left side, and the other sampled image is positioned on the right side, thereby creating a single stereoscopic image. The top-bottom format shown in (b) corresponds to a format, wherein a left image and a right image are ½ down-sampled in a vertical direction. Herein, one of the sampled images is positioned on the upper side, and the other sampled image is positioned on the lower side, thereby creating a single stereoscopic image. The interlaced format shown in (c) corresponds to a format, wherein a left image and a right image are ½ down-sampled in a horizontal direction so that the two images can be alternated line by line, thereby creating a single stereoscopic image, or wherein a left image and a right image are ½ down-sampled in a vertical direction so that the two images can be alternated line by line, thereby creating a single stereoscopic image. The frame sequential format shown in (d) corresponds to a format, wherein a left image and a right image are temporally alternated and configured in a single video stream. The checker board format shown in (e) corresponds to format, wherein a left image and a right image are ½ down-sampled so that the left image and the right image can be alternated in each of the horizontal and vertical directions, thereby configuring the two images into a single image. The anaglyph format shown in (f) corresponds to a format configuring an image so that the image can present a cubic effect by using complementary color contrast.

The present digital broadcasting provides broadcast services by using limited system resources. The system resources of a digital broadcasting environment include transmission bandwidth, processing capability, and so on. Particularly, the bandwidth that can be used in the assignment (or allocation) of a frequency is limited. In such a digital broadcasting environment, when a 3D broadcast service is provided, the corresponding 3D broadcast service will also use the limited resources used in the digital broadcasting environment.

According to an embodiment of the present invention, in case of a 3D broadcast service using a stereoscopic image scheme, a left-view image and a right-view image should be transmitted. Therefore, it is difficult to transmit the two images at a high resolution by using the bandwidth of the conventional digital broadcasting. For example, when transmitting full-resolution video data using a bandwidth of digital broadcasting, it is difficult to transmit 2 sets of full-resolution video data by using the same bandwidth. Therefore, a method of transmitting 2 sets of half-resolution video data is being proposed.

Nevertheless, a full-resolution 3D broadcast service is required to be provided so as to satisfy the demands of the user for high picture quality. However, even when a full-resolution 3D broadcast service is being provided, the full-resolution 3D broadcast service should be compatible to the conventional half-resolution 3D broadcast service.

Figure 2:
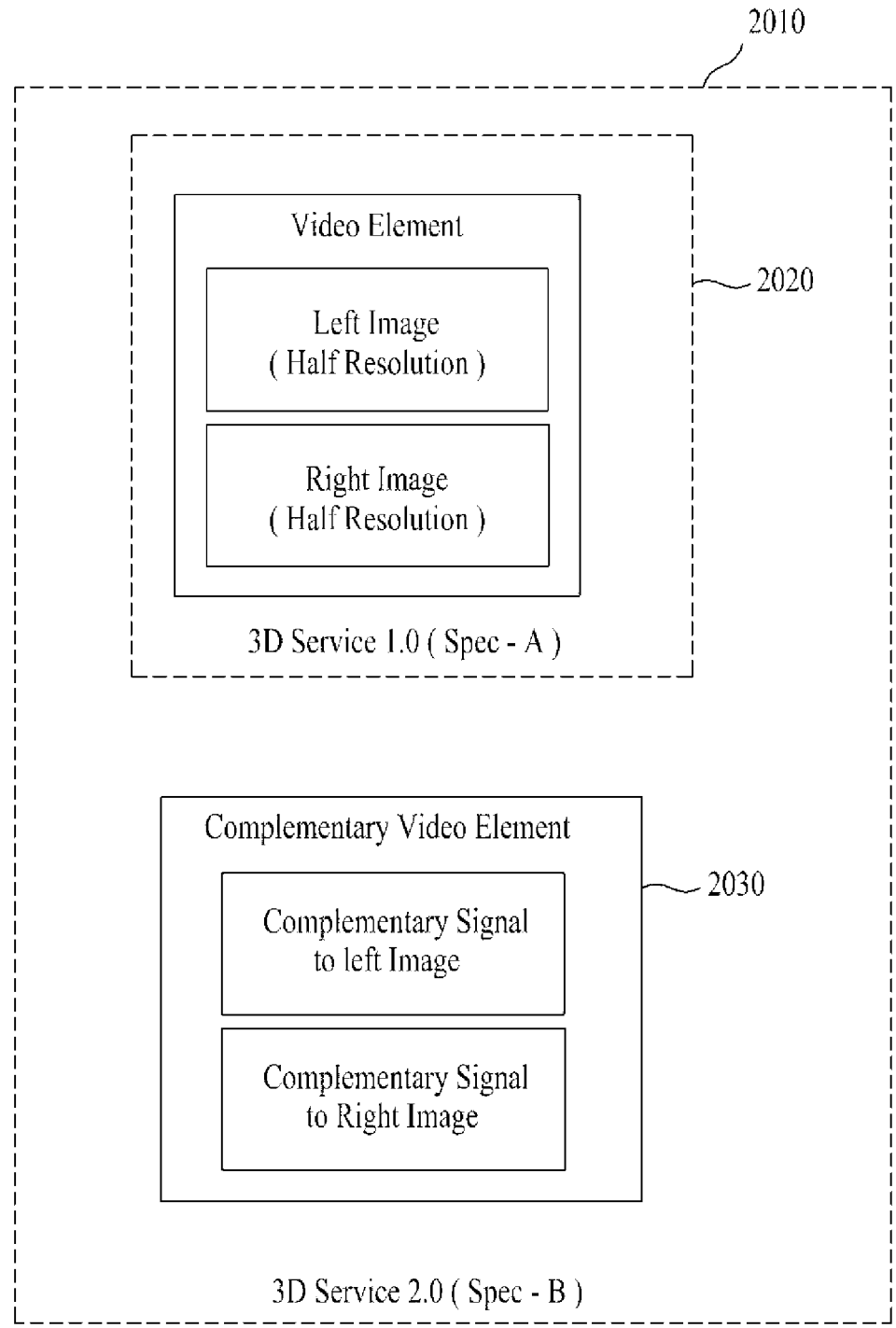
FIG. 2 shows a conceptual diagram of a 3D broadcast service according to an embodiment of the present invention.

FIG. 2 shows a conceptual diagram of a 3D broadcast service according to an embodiment of the present invention.

According to an embodiment of FIG. 2, a 3D broadcast service (2010) providing full-resolution images may hereinafter be referred to as a 3D service 2.0 or a 3D service Spec-B. A 3D broadcast service (2020) providing half-resolution images may hereinafter be referred to as a 3D service 1.0 or a 3D service Spec-A.

The 3D service 1.0 (2020) may be serviced to a half-resolution left image and to a half-resolution right image. Since the 3D service 2.0 (2010) providing full-resolution images should be compatible to the 3D service 1.0 (2020), instead of newly transmitting full-resolution images, a method of maintaining the image transmission of the 3D service 1.0 (2020) and providing differential data or additional data for providing full-resolution images may be used. More specifically, as shown in FIG. 2, a full-resolution 3D broadcast service (2010) may be provided by adding a complementary video element (2030) of the 3D service 2.0 to a half-resolution video element of the 3D service 1.0 (2020). Eventually, a broadcast receiver that can support 3D service 1.0 may provide half-resolution images by receiving and processing data of the 3D service 1.0 (2020), and a broadcast receiver that can support 3D service 2.0 may provide full-resolution images by receiving and processing data of the 3D service 1.0 (2020) and complementary data of the 3D service 2.0.

Figure 3:
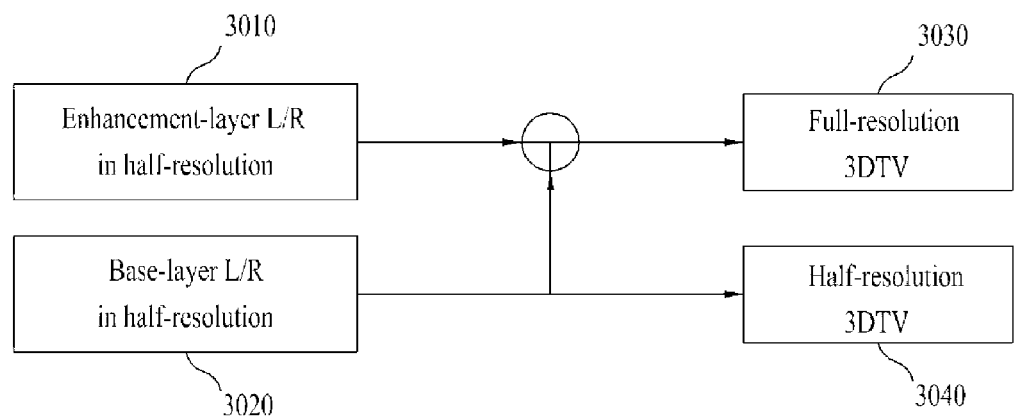
FIG. 3 illustrates a conceptual block diagram showing a method for providing a full-resolution 3D broadcast service according to an embodiment of the present invention.

FIG. 3 illustrates a conceptual block diagram showing a method for providing a full-resolution 3D broadcast service according to an embodiment of the present invention.

In the present invention, a digital broadcast receiver (3030) that can provide full-resolution 3D images and a digital broadcast receiver (3040) that can support half-resolution 3D images may each be provided.

A broadcasting system providing 3D broadcast services may transmit half-resolution 3D video data through a base layer (3020) and may transmit additional half-resolution 3D video data for providing full-resolution 3D images through an enhancement layer (3010).

The digital broadcast receiver (3040) that can support half-resolution 3D images may provide half-resolution 3D images by receiving and processing video data of the base layer (3020). Also, the digital broadcast receiver (3030) that can provide full-resolution 3D images may provide full-resolution 3D images by receiving and processing video data of the base layer (3020) and video data of the enhancement layer (3010).

Hereinafter, the video data or video component of the base layer may be respectively referred to as base video data or a base video component, and the video data or video component of the enhancement layer may be respectively referred to as complementary video data or a complementary video component, for simplicity.

Figure 4:
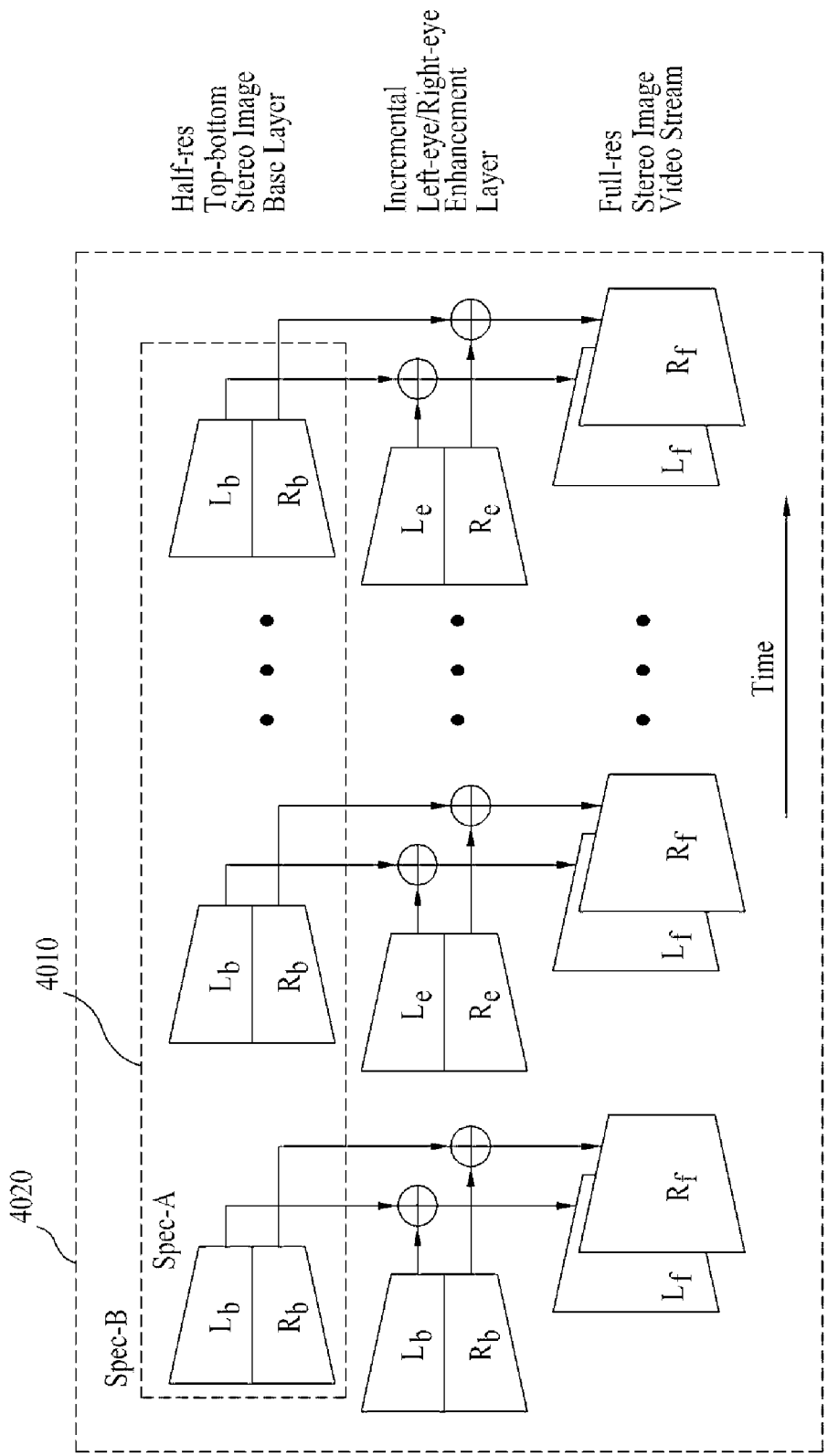
FIG. 4 illustrates a method for providing a 3D broadcast service according to an embodiment of the present invention.

FIG. 4 illustrates a method for providing a 3D broadcast service according to an embodiment of the present invention.

Referring to FIG. 4, a 3D service Spec-A (4010) indicates 3D video data being transmitted through the base layer, and according to the embodiment of FIG. 3, the 3D video data are provided in a half-resolution top-bottom image format.

A 3D service Spec-B (4020) transmits complementary data for the images of each perspective through the enhancement layer. The receiving system receives the transmitted complementary data. And, the received complementary data are additionally processed to the 3D video data transmitted from the 3D service Spec-A (4010), thereby enabling the receiving system to provide the full-resolution stereoscopic images.

FIG. 5 illustrates a method for providing a 3D broadcast service according to another embodiment of the present invention.

According to an embodiment of the present invention, a 3D service Spec-A (5010) corresponds to the top-bottom image format and may include spatially half-resolution and temporally full-resolution 3D video data. According to another embodiment of the present invention, the video data of the 3D service Spec-A (5010) may be interpolated in the receiving system, so as to be provided in spatially full-resolution and temporally half-resolution. The receiving system of a 3D service Spec-B (5020) may additionally process complementary information so as to provide both spatially and temporally full-resolution images.

In the definition of the temporally half-resolution and spatially full-resolution, the size or the amount of the video data that can be transmitted (or transmittable video data) may be limited due to the limitation of the system resources. The video data may include frame-unit images. Herein, depending upon the size of the transmittable video data, the distance between the frame-unit images that can be temporally positioned may also be limited along with the resolution of the images. For example, due to a limitation in a predetermined bandwidth, if a set of transmittable video data is spatially in half-resolution and temporally in full-resolution, and when spatially full-resolution images are being transmitted within the limitations of the same bandwidth, only the temporally half-resolution (e.g., two times the distance of a frame distance in case of the temporally full-resolution) video data may be transmitted.

A variety of embodiments for the method of processing video data according to the resolution in the receiving system may be available.

The receiving system of the 3D service Spec-A (5010) may perform interpolating on the received image (Lb or Rb), so as to provide an image close to full-resolution (Lb' or Rb') (drawing on the left bottom side of FIG. 5).

The receiving system of the 3D service Spec-B (5020) may use the video data received in the base layer and the video data received in the enhancement layer. The receiving system may interleave and combine the horizontal lines of the received image of the base layer (Lb or Rb) and the received image of the enhancement layer (Le or Re), thereby providing full-resolution images (Lf or Rf). Also, the receiving system may perform low-pass filtering on the received image of the base layer (Lb or Rb) and may perform high-pass filtering on the received image of the enhancement layer (Le or Re), thereby combining the two images and reconstructing the full-resolution image (Lf or Rf). Also, the receiving system may perform interpolating on the received image of the base layer (Lb or Rb) and supplement the interpolated full-resolution (close to full-resolution) image (Lb' or Rb') with a complementary information image (Le or Re), thereby providing the full-resolution image (Lf or Rf) (drawing on the right bottom side of FIG. 5).

FIG. 6 illustrates a method for providing a 3D broadcast service according to another embodiment of the present invention.

According to an embodiment of the present invention, a 3D service Spec-A (6010) corresponds to the side-by-side image format and may include spatially half-resolution and temporally full-resolution 3D video data. According to another embodiment of the present invention, the video data of the 3D service Spec-A (6010) may be interpolated in the receiving system, so as to be provided in spatially full-resolution and temporally half-resolution. The receiving system of a 3D service Spec-B (6020) may additionally process complementary information so as to provide both spatially and temporally full-resolution images.

In case of FIG. 6, apart from the fact that the image format corresponds to the side-by-side image format, the remaining description of FIG. 6 is identical to that of FIG. 5. Therefore, the overlapping description of the present invention will be omitted fro simplicity. However, referring to FIG. 6, in case of interleaving the received image of the base layer (Lb or Rb) and the received image of the enhancement layer (Le or Re), the receiving system of the 3D service Spec-B (6020) may interleave and combine the vertical lines, thereby providing full-resolution images.

Figure 7:
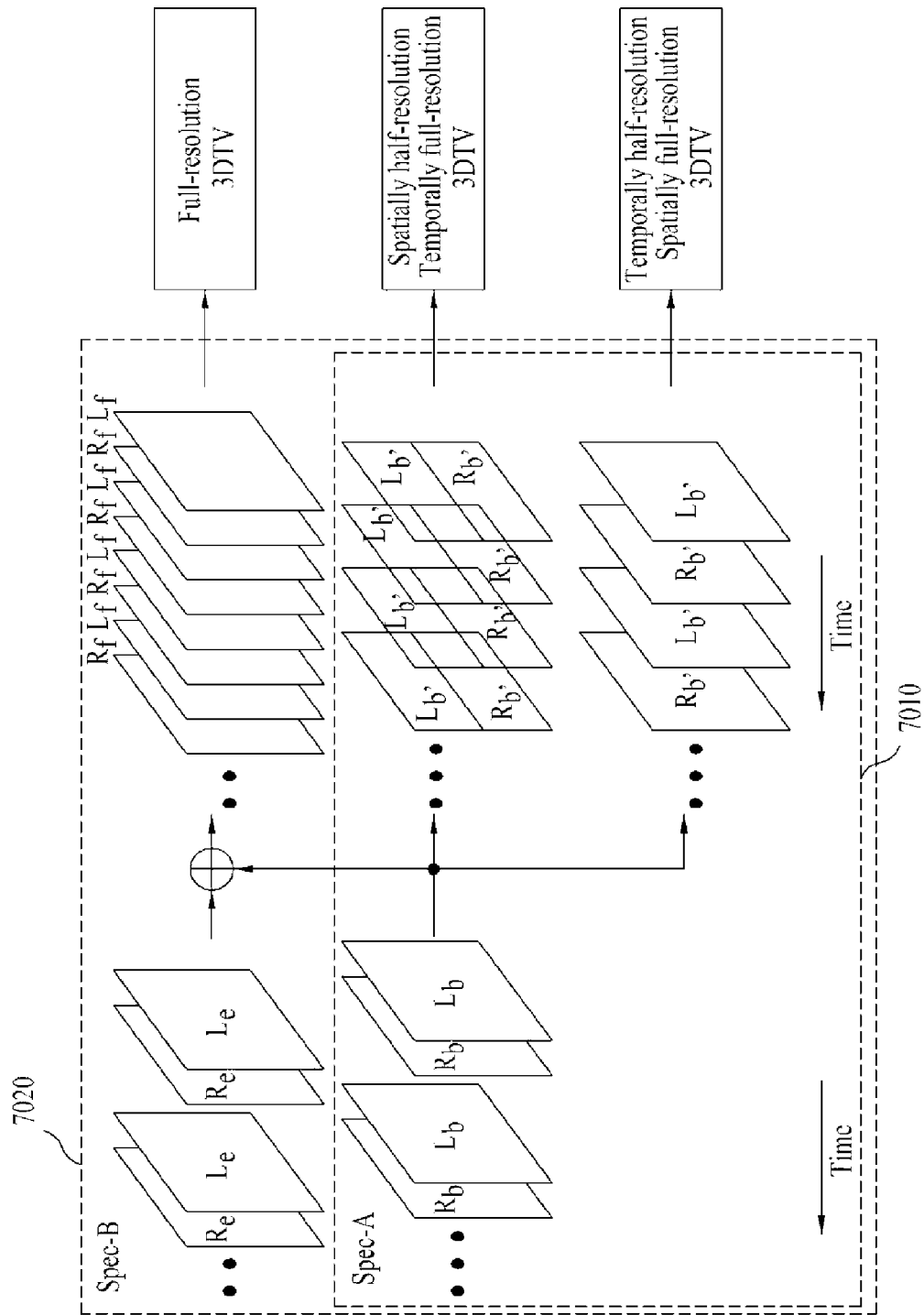
FIG. 7 illustrates a method for providing a 3D broadcast service according to another embodiment of the present invention.

FIG. 7 illustrates a method for providing a 3D broadcast service according to another embodiment of the present invention.

According to an embodiment of the present invention, a 3D service Spec-A (7010) corresponds to the frame sequential image format and may include spatially full-resolution and temporally half-resolution 3D video data. According to another embodiment of the present invention, the video data of the 3D service Spec-A (7010) may be format-converted in the receiving system, so as to be provided in spatially half-resolution and temporally full-resolution. The receiving system of a 3D service Spec-B (7020) may additionally process complementary information so as to provide both spatially and temporally full-resolution images.

According to the embodiment of the present invention, the receiving system of the 3D service Spec-A (7010) may perform decimation on the received image (Lb or Rb), thereby creating (or generating) half-resolution images (Lb' or Rb') of the top-bottom format or the side-by-side format. At this point, while performing decimation, the receiving system acquires a half-resolution images (Lb' or Rb') in the top-bottom format or the side-by-side format. At this point, while performing decimation, the receiving system acquires a pair of half-resolution images that is temporally extended (e.g., doubled) through a frame rate conversion, thereby being capable of providing spatially and temporally full-resolution images.

According to another embodiment, the receiving system of the 3D service Spec-B (7020) respectively inserts images received through the enhancement layer (Le or Le) in-between each consecutive image (Lb or Rb) received through the base layer, thereby being capable of providing spatially and temporally full-resolution images.

As described above, in order to provide a 3D broadcast service of a high resolution, complementary video data should be provided for the 3D broadcast service of the resolution currently being provided, and, accompanying the complementary video data, signaling information for the complementary video data is also required to be transmitted/received and processed.

Hereinafter, a method for signaling complementary video data and information on such complementary video data will be described in detail. According to an embodiment of the present invention, the complementary video data may use an H.264/SVC (Scalable Video Coding) or MVC (Multi-view Video Coding) method as a layered image compression encoding method. And, at this point, the complementary video data may be transmitted through the enhancement layer.

The transmitted signaling information on the complementary video data may be referred to as 3D complementary video information. The 3D complementary video information may be provided in a descriptor or table format according to the embodiment of the present invention, wherein the 3D complementary video information may be referred to as a 3D complementary video descriptor or a 3D complementary video table.

According to the embodiment of the present invention, the 3D complementary video information may be included in the PSIP, which is transmitted from the ATSC broadcasting system, and may particularly be included in the TVCT (or VCT) of the PSIP, thereby being transmitted. Also, the 3D complementary video information may be included in the PSI, which is transmitted from the ATSC broadcasting system, and may particularly be included in the PMT of the PSI. Furthermore, the 3D complementary video information may be included in the complementary video information and may particularly be included in header information of the complementary video ES (Elementary Stream), thereby being transmitted.

Hereinafter, the method for signaling 3D complementary video information will be described in detail.

First of all, a method for signaling 3D complementary video information using the TVCT will now be described in detail.

FIG. 8 illustrates a syntax structure of a TVCT including 3D complementary video information according to an embodiment of the present invention.

The fields included in the TVCT of FIG. 8 will be described as follows.

A 'table_id' field is an 8-bit unsigned integer number field that indicates the type of table section.

A 'section_syntax_indicator' field is a one-bit field which shall be set to '1' for the 'terrestrial_virtual_channel_table_section( )' field.

A 'private_indicator' field is a one-bit field which shall be set to '1'.

A 'section_length' field is a 12-bit field in which the first two bits shall be set to '00', and specifies the number of bytes of the section, starting immediately following the 'section_length' field, and including the CRC.

A 'transport_stream_id' field indicates the 16-bit MPEG-2 Transport Stream (TS) ID. The 'transport_stream_id' field distinguishes a Terrestrial Virtual Channel Table (TVCT) from others that may be broadcast in different PTCs.

A 'version_number' field serving as a 5-bit field indicates a version number of the Virtual Channel Table (VCT).

A 'current_next_indicator' field is a one-bit indicator. In the case where the 'current_next_indicator' field is set to '1', this means that a transmitted Virtual Channel Table (VCT) is currently applicable. When a bit of the 'current_next_indicator' field is set to '0', this means that the transmitted table is not yet applicable and shall be the next table to become valid.

A 'section_number' field is an 8-bit field which gives the number of this section.

A 'last_section_number' field serving as an 8-bit field specifies the number of the last section (that is, the section with the highest section_number value) of the complete Terrestrial Virtual Channel Table (TVCT).

A 'protocol_version' field serving as an 8-bit unsigned integer field is used to allow, in the future, the table type to carry parameters that may be structured differently than those defined in the current protocol.

A 'num_channels_in_section' field serving as an 8-bit field specifies the number of virtual channels in this VCT section.

A 'short_name' field may indicate the name of the virtual channel, represented as a sequence of one to seven 16-bit code values interpreted in accordance with the UTF-16 standard for unicode character data.

A 'major_channel_number' field indicates a 10-bit number that represents the 'major' channel number associated with the virtual channel being defined in this iteration of the 'for' loop.

A 'minor_channel_number' field indicates a 10-bit number in the range from '0' to '999' so as to represent the 'minor' or 'sub' channel number. This 'minor_channel_number' field together with the 'major_channel_number' field may indicate a two-part channel number, where the minor_channel_number represents the second or right-hand part of the number.

A 'modulation_mode' field including an 8-bit unsigned integer may indicate a modulation mode for the transmitted carrier associated with the virtual channel.

A 'carrier_frequency' field may indicate an allowed carrier frequency.

A 'channel_TSID' field is a 16-bit unsigned integer field in the range from 0x0000 to 0xFFFF. The 'channel_TSID' field represents an MPEG-2 Transport Stream (TS) ID associated with the Transport Stream (TS) carrying the MPEG-2 program referenced by the virtual channel.

A 'program_number' field includes a 16-bit unsigned integer that associates the virtual channel being defined here with the MPEG-2 program association and TS program map tables.

An 'ETM_location' field serving as a 2-bit field specifies the existence and the location of an Extended Text Message (ETM).

An 'access_controlled' field indicates a 1-bit Boolean flag. When the Boolean flag of the 'access_controlled' field is set, this means that accessing the events associated with a virtual channel may be controlled.

A 'hidden' field indicates a 1-bit Boolean flag. When the Boolean flag of the 'hidden' field is set, this means that the virtual channel is not accessed by a user by a direct entry of the virtual channel number.

A 'hide_guide' field indicates a Boolean flag. When the Boolean flag of the 'hide_guide' field is set to zero '0' for a hidden channel, this means that the virtual channel and virtual channel events may appear in EPG displays.

A 'service_type' field is a 6-bit enumerated type field that shall identify the type of service carried in the virtual channel.

A 'source_id field' includes a 16-bit unsigned integer that identifies the programming source associated with the virtual channel.

A 'descriptors_length' field may indicate a total length (in bytes) of descriptors for a virtual channel.

A 'descriptor( )' field may include zero or more descriptors determined to be appropriate for the 'descriptor( )' field.

An 'additional_descriptors_length' field may indicate a total length (in bytes) of a VCT descriptor list.

A 'CRC_32' field is a 32-bit field which contains a CRC value that ensures a zero output of registers in the decoder defined in Annex A of ISO/IEC 13818 1 "MPEG-2 Systems" [8] after processing the entire Terrestrial Virtual Channel Table (TVCT) section.

When a broadcast service being provided from a corresponding channel is the 3D service 2.0, a service_type field (8010) corresponds to a field indicating this information. For example, when a field value of the service_type field (8010) is 0x13, this indicates that a 3D broadcast program (audio, video, and complementary video data for displaying 3D stereoscopic images) is being provided from a corresponding virtual channel.

A descriptor field (8020) includes the 3D complementary video information and will hereinafter be described in detail with reference to the accompanying drawings.

FIG. 9 illustrates a syntax structure of a 3D complementary video descriptor included in a TVCT according to an embodiment of the present invention.

The fields included in the 3D complementary video descriptor of FIG. 9 will now be described as follows.

A number_elements field indicates a number of video elements configuring a respective virtual channel. The broadcast receiver may receive a 3DTV service location descriptor, so as to parse information included in fields below the numers_elements field as number of times, the number correponding to a number of video elements configuring the respective virtual channel.

A complementary_type field indicates a method of configuring complementary video data or complementary video streams. When full-resolution images are being outputted, the receiving system uses the information of this field to reconfigure (or reconstruct) the base video data and the complementary video data into a full-resolution image.

A naive_subsampling_flag field indicates whether subsampling is being performed or whether low-pass filtering and high-pass filtering are being performed, when a base video component and a complementary video component are being configured. For example, when the field value of the naive_subsampling_flag field is equal to 1, this indicates that subsampling is being performed. And, when the field value is equal to 0, this indicates that low-pass filtering and high-pass filtering are being performed.

A codec_type field indicates a type of video codec used for encoding or compressing a complementary video component. For example, depending upon the field value of the codec_type field, a coding scheme such as MPEG-2, AVC/H.264, SVC Extension, and so on, may be indicated.

A horizontal_size field, a vertical_size field, and a frame_rate size field respectively indicate a horizontal size, a vertical size, and a frame rate of the complementary video component. Herein, the horizontal size and the vertical size may indicate spatial resolution, and the frame rate may indicate temporal resolution. For example, when the field value of the complementary_type field is equal to 0x0004, the spatial/temporal resolutions of the complementary video component may both become a full-resolution.

An interpolation_filter_available_flag field indicates whether or not a extra customized filter is being used, when interpolation is performed with respect to the base video component. At this point, according to an embodiment of the present invention, information such as a filter coefficient for implementing a filter may be included in a descriptor loop for the complementary video component in the TVCT or PMT and may be provided in a descriptor format. And, according to another embodiment of the present invention, such information may be included in header information or message information within a video element, thereby being provided.

Among the video data for a left view and the video data for a right view configuring the complementary video information, a left_image_first_flag field indicates which of the two video data occur (or are generated) first. According to an embodiment of the present invention, when the video data corresponding to the left view is received first, the field value of the left_image_first_flag field may be set to 1.

A complementary_first_flag field indicates an order of combining the base video component and the complementary video component during the procedure of configuring a full-resolution image. According to an embodiment of the present invention, when the video data corresponding to the base video component precedes the video data corresponding to the complementary video component, the field value of the complementary_first_flag field may be set to 1.

FIG. 10 illustrates an image configuration method according to a field value of a complementary_type field included in 3D complementary video information according to an embodiment of the present invention.

The complementary_type field included in FIG. 9 indicates a method of configuring complementary video data or complementary video streams. And, the receiving system uses the information of this field to reconfigure (or reconstruct) the base video data and the complementary video data into a full-resolution image. Herein, according to an embodiment of the present invention, the reconfiguration (or reconstruction) of the full-resolution image according to the field value of the complementary_type field may be diversely performed as shown in FIG. 10.

1) when the field value of the complementary_type field is equal to 0:

The complementary_type field indicates that complementary video data are line-interleaved and carry video data for the complementary line.

The complementary video data may include video data for even lines or odd lines, which are added to the base video data in order to configure a full-resolution image. The video data for even lines or odd lines may be horizontally or vertically line-interleaved according to the multiplexing format of the base video data, so as to be generated (or created). According to an embodiment of the present invention, when the base video data correspond to the side-by-side format, the vertical line-interleaving may be performed, and when the based video data correspond to the top-bottom format, the horizontal line-interleaving may be performed.

2) when the field value of the complementary_type field is equal to 1:

The complementary_type field indicates that the complementary video data are pixel-interleaved and carry order information on the perspective of the image being alternated (or changed) for each line. Herein, the order information corresponds to information on the pixels for reconfiguring a full-resolution image.

The complementary video data may be interleaved in pixel units, so as to be transmitted in a checkerboard format. In this case, a pixel of a left image and a pixel of a right image may be alternated in pixel units (or on a pixel-by-pixel basis) within a single line. Also, in order to normally recover the full-resolution image, the receiving system is required to transmit such information on the order of alternation. In this case, regarding the video data included in the first pixel of the full-resolution image, which is being reconfigured (or reconstructed), the complementary_first_flag field indicates to which perspective or layer the video data included in the first pixel corresponds.

3) when the field value of the complementary_type field is equal to 2:

The complementary_type field indicates that the complementary video data are frame-interleaved and include complementary frames for reconfiguring (or reconstructing) a full-resolution image.

According to the embodiment of the present invention, the meaning of full-resolution signifies temporal resolution. In this case, the complementary video data may include image data interleaved in frame units (or on a frame-by-frame basis) and may also include video data on a frame-by-frame (or frame sequential) basis. The complementary_first_flag field may notify the receiving system whether the video frame being received through the complementary video component is positioned before or after the video frame being received through the base video component.

4) when the field value of the complementary_type field is equal to 3:

The complementary_type field indicates that the complementary video data are field-interleaved and include complementary frames for reconfiguring (or reconstructing) a full-resolution image.

According to the embodiment of the present invention, the meaning of full-resolution signifies temporal resolution. In this case, the complementary video data may include image data interleaved in field units (or on a field-by-field basis) and may also include video data on a field-by-field basis. The complementary_first_flag field may notify the receiving system whether the video field being received through the complementary video component corresponds to an even field or an odd field for the full-resolution image.

5) when the field value of the complementary_type field is equal to 4:

The complementary_type field may indicate that the complementary video data include residual or incremental data for reconfiguring (or reconstructing) the full-resolution image.

According to the embodiment of the present invention, regardless of the stereo-multiplexing format of the base video component, the complementary video component includes residual or incremental data for reconfiguring (or reconstructing) the full-resolution image. In this case, prior to combining the complementary video data and the base video data, the receiving system may perform interpolation or doubling on the base video data.

Subsequently, a method for signaling 3D complementary video information using the PMT will now be described in detail.

FIG. 11 illustrates a syntax structure of a PMT including 3D complementary video information according to an embodiment of the present invention.

The fields included in the PMT of FIG. 11 will be described as follows.

A 'table_id' field is an 8-bit field which shall always be set to '0x02' in a 'TS_program_map_section' field.

A 'section_syntax_indicator' field is a 1-bit field which shall be set to '1'.

A 'section_length' field is a 12-bit field in which first two bits shall be set to '00', and specifies the number of bytes of the section starting immediately the 'section_length' field, and including the CRC.

A 'program_number' field is a 16-bit field, which specifies the program to which the 'program_map_PID' field is applicable.

A 'version_number' field is a 5-bit field, which indicates the version number of the 'TS_program_map_section' field.

A 'current_next_indicator' field is a 1-bit field. When a bit of the 'current_next_indicator' field is set to '1', this means that the transmitted 'TS_program_map_section' field is currently applicable. When a bit of the 'current_next_indicator' field is set to '0', this means that the transmitted 'TS_program_map_section' field is not yet applicable and shall be the next 'TS_program_map_section' field to become valid.

A 'section_number' field includes a value of an 8-bit field which shall be '0x00'.

A 'last_section_number' field includes a value of an 8-bit field which shall be '0x00'.

A 'PCR_PID' field is a 13-bit field indicating the PID of the Transport Stream (TS) packets which shall contain the PCR fields valid for the program specified by a 'program_number' field. In the case where no PCR is associated with a program definition for private streams, then this field shall take the value of '0x1FFF'.

A 'program_info_length' field is a 12-bit field, the first two bits of which shall be '00'. The 'program_info_length' field specifies the number of bytes of descriptors immediately following the 'program_info_length' field.

A 'stream_type' field is an 8-bit field specifying the type of elementary stream or payload carried within packets with the PID whose value is specified by the 'elementary_PID' field. In addition, the 'stream_type' field may indicate a coding type of a corresponding video element. As an exemplary coding type, a JPEG, an MPEG-2, an MPEG-4, an H.264/AVC, an H.264/SVC or H.264/MVC scheme may be used.

An 'elementary_PID' field is a 13-bit field specifying a PID of the Transport Stream (TS) packets which carry the associated elementary stream or payload. This PID may be used as a PID of primary video data or secondary video data.

An 'ES_info_length' field is a 12-bit field, the first two bits of which shall be '00'. The 'ES_info_length' field may specify the number of bytes of descriptors of the associated elementary stream immediately following the 'ES_info_length' field.

A 'CRC_32' field is a 32-bit field which contains a CRC value that gives a zero output of registers in the decoder defined in Annex B after processing the entire Transport Stream program map section.

A descriptor field (11010) includes 3D complementary video information and will hereinafter be described in detail with reference to the accompanying drawings.

FIG. 12 illustrates a syntax structure of a 3D complementary video descriptor included in a PMT according to an embodiment of the present invention.

The 3D complementary video information of FIG. 12 is similar to the 3D complementary video information of FIG. 9. And, therefore, detailed description on the identical fields will be omitted for simplicity. Nevertheless, in case of the PMT, unlike in the 3D complementary video information shown in FIG. 9, information such as an elementary_PID on the video element is included in the PMT. And, the description of this field is identical to the detailed description made on the same field with reference to FIG. 9. Also, the codec_type field may be replaced with a stream_type field included in the PMT. And, in this case, this field may be omitted from the 3D complementary video descriptor of FIG. 12.

Subsequently, a method for signaling 3D complementary video information through a complementary video ES included in the complementary video data will now be described in detail.

Figure 13:
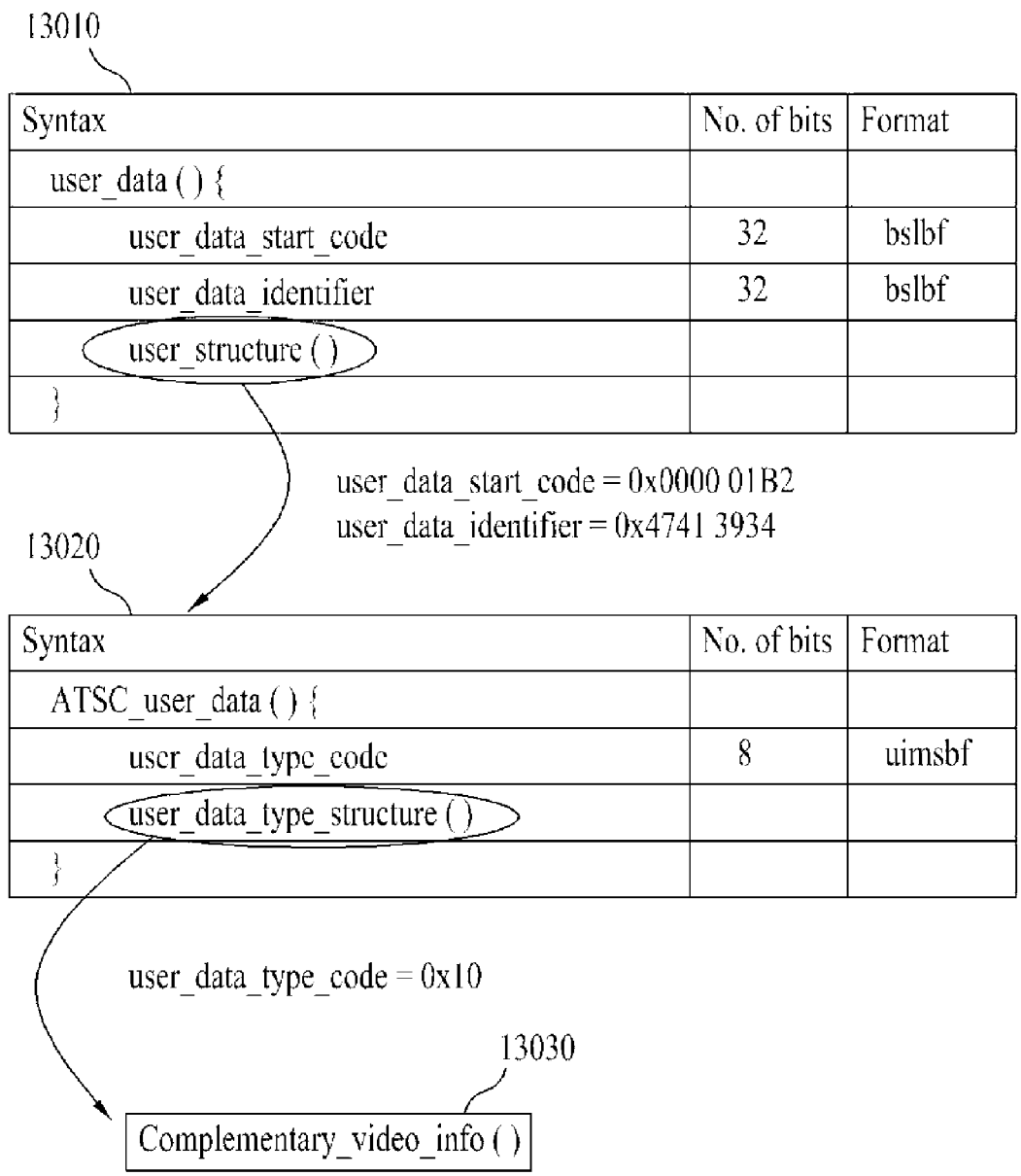
FIG. 13 illustrates a syntax structure of a Picture Extension and user Data of a video ES included 3D complementary video information according to an embodiment of the present invention.

FIG. 13 illustrates a syntax structure of a Picture Extension and user Data of a video ES including 3D complementary video information according to an embodiment of the present invention.

According to an embodiment of the present invention, an ATSC telecommunications system may include 3D complementary video information in the header information of a video ES, instead of a PISP layer, and may signal the corresponding information. More specifically, 3D complementary video information (complementary_video_info( ); 13030) may be included in the complementary video ES so as to be transmitted, and, by parsing the corresponding information in the video decoder, the receiving system may acquire information required for controlling display output.

According to an embodiment of the present invention, when the complementary video data are encoded by using an MPEG-2 video coding scheme, the 3D complementary video information may be included in a user_data( ) (13010) of a Picture Extension and user Data, so as to be transmitted. The Picture Extension and user Data may be received after a Picture Header and a Picture Coding Extension, thereby being decoded.

In the embodiment of FIG. 13, a field value of a user_data_start_code field is fixed to 0x0000 01B2.

A field value of a user_data_identifier (or ATSC_identifier) field corresponds to a 32-bit code given a value of 0x4741 3934.

A user_data_type_code field indicates a data type of an ATSC user data (13020) and may have a field value of 8 bits. According to an embodiment of the present invention, by using a value of 0x10, this field may indicate that the 3D complementary video information (13030) is included.

FIG. 14 illustrates a syntax structure when 3D complementary video information is included in an SEI (Supplemental Enhancement Information) message of a video ES and transmitted according to an embodiment of the present invention.

In the embodiment shown in FIG. 14, in case of the H.264 (or AVC) video data and the MVC extension video data, complementary information may be transmitted to an SEI (Supplemental Enhancement Information) region, and a user_data_registered_itu_t_t35( ) may be used to transmit 3D complementary video information through a user_identifier and a user_structure( ).

In the embodiment shown in FIG. 14, when the complementary video data are encoded to AVC/H.264, an ATSC_user_data( ) shown in FIG. 13 may be positioned in a user_structure( ) of an SEI syntax (user_identifier=0x4741 3934) for transmitting 3D complementary video information from a respective video stream.

FIG. 15 illustrates a syntax structure of 3D complementary video information being included and transmitted in a complementary video ES according to an embodiment of the present invention.

The 3D complementary video information (Complementary_video_info( )) of FIG. 15 is similar to the 3D complementary video information of FIG. 9. And, therefore, detailed description on the identical fields will be omitted for simplicity.

Hereinafter, the method for providing a full-resolution image using base video data, complementary video data, and 3D complementary video data received from a 3D video service Spec-B will now be described in detail.

FIG. 16 illustrates a method for providing a full-resolution image using base video data, complementary video data, and 3D complementary video information received from a 3D video service Spec-B according to an embodiment of the present invention.

In the embodiment of FIG. 16, the image of the base video data is received in the top-bottom format, wherein the left image is positioned at the top side, and wherein the right image is positioned at the bottom side. In case of the 3D complementary video information, the field value of the complementary_type field is indicated as '0x0000', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data are processed with line-interleaving, that low-pass filtering and high-pass filtering are not performed when performing subsampling, that the video data corresponding to the left view is presented first, and that the video data corresponding to the base video precede the video data corresponding to the complementary video.

Depending upon the 3D complementary video information, the receiving system extracts left image portions (Lb1~Lb5) from a base video frame (16010) of the top-bottom format, extracts left image portions (Lc1~Lc5) from a complementary video frame (16020), and reconfigures (or reconstructs) the extracted video data line-by-line, thereby acquiring a full-resolution left image (16030). Similarly, depending upon the 3D complementary video information, the receiving system extracts right image portions (Rb1~Rb5) from a base video frame (16010) of the top-bottom format, extracts right image portions (Rc1~Rc5) from a complementary video frame (16020), and reconfigures (or reconstructs) the extracted video data line-by-line, thereby acquiring a full-resolution right image (16040).

The receiving system may display the acquired full-resolution left image (16030) and right image (16040) through a frame sequential scheme. In this case, since two frames (16030, 16040) are generated from one frame (16010) in frame units, temporal full-resolution display becomes available.

Figure 17:
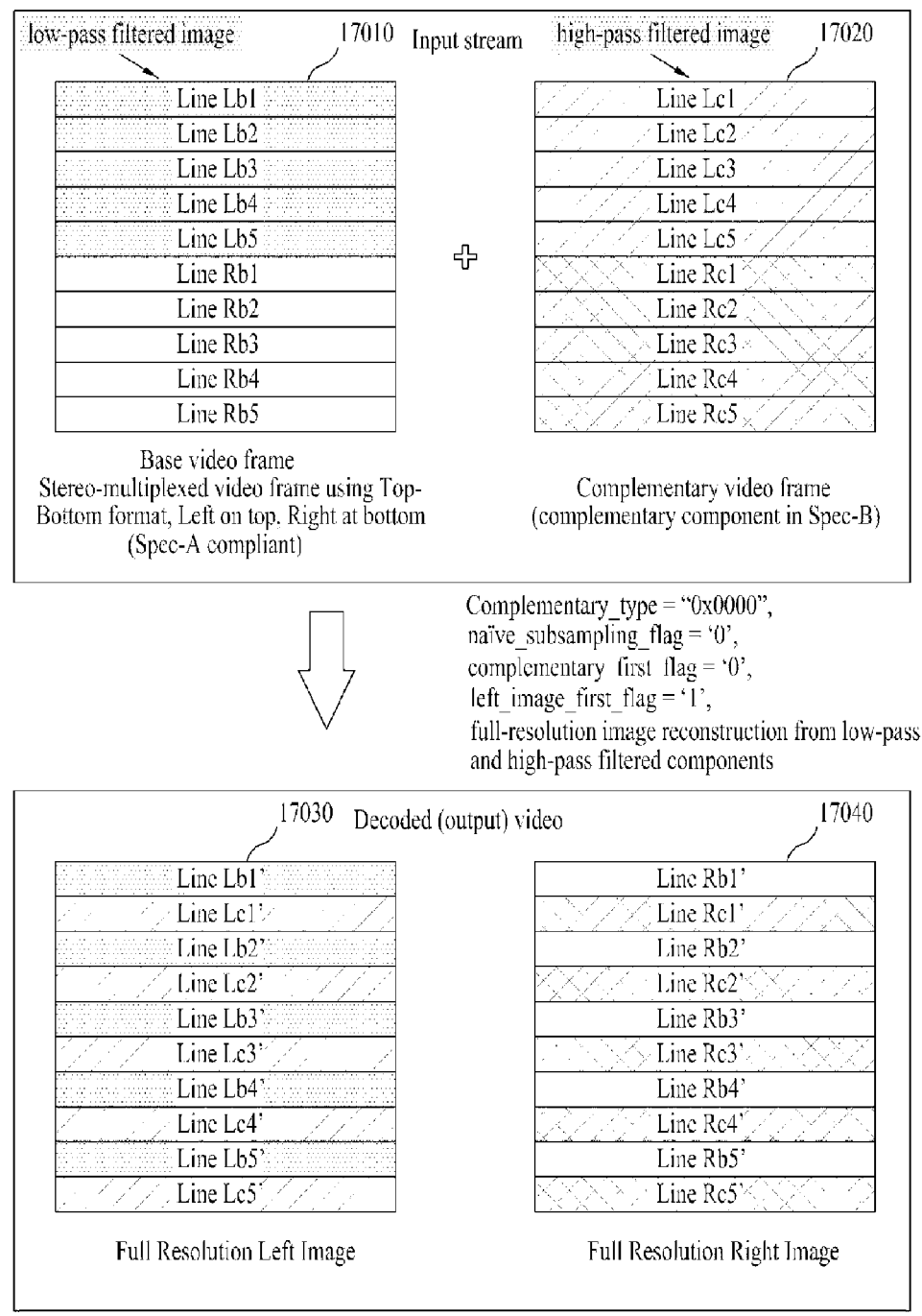
FIG. 17 illustrates a method for providing a full-resolution image using base video data, complementary video data, and 3D complementary video information received from a 3D video service Spec-B according to another embodiment of the present invention.

FIG. 17 illustrates a method for providing a full-resolution image using base video data, complementary video data, and 3D complementary video information received from a 3D video service Spec-B according to another embodiment of the present invention.

In the embodiment of FIG. 17, the image of the base video data is received in the top-bottom format, wherein the left image is positioned at the top side, and wherein the right image is positioned at the bottom side. In case of the 3D complementary video information, the field value of the complementary_type field is indicated as '0x0000', the field value of the naive_subsampling_flag field is indicated as '0', the field value of the left_image_first_flag field is indicated as '1', and the field value of the complementary_first_flag field is indicated as '0'. More specifically, the 3D complementary video information indicates that the complementary video data are processed with line-interleaving, that low-pass filtering and high-pass filtering must be performed when performing subsampling, that the video data corresponding to the left view is presented first, and that the video data corresponding to the base video precede the video data corresponding to the complementary video.

Firstly, depending upon the 3D complementary video information, the receiving system performs low-pass filtering on the base video frame, thereby acquiring filtered base video frames (Lb1'~Lb5' and Rb1'~Rb5'). Also, the receiving system performs high-pass filtering on the complementary video frame, thereby acquiring filtered complementary video frames (Lc1'~Lc5' and Rc1'~Rc5').

Depending upon the 3D complementary video information, the receiving system extracts low-pass filtered left image portions (Lb1'~Lb5') from a base video frame of the top-bottom format and extracts low-pass filtered left image portions (Lc1'~Lc5') from a complementary video frame. Thereafter, the receiving system reconfigures (or reconstructs) the extracted video data line-by-line, thereby acquiring a full-resolution left image (1030). Similarly, depending upon the 3D complementary video information, the receiving system extracts low-pass filtered right image portions (Rb1'~Rb5') from a base video frame of the top-bottom format and extracts low-pass filtered right image portions (Rc1'~Rc5') from a complementary video frame. Then, the receiving system reconfigures (or reconstructs) the extracted video data line-by-line, thereby acquiring a full-resolution right image (17040).

The receiving system may display the acquired full-resolution left image (17030) and right image (17040) through a frame sequential scheme. In this case, since two frames (17030, 17040) are generated from one frame (17010) in frame units, temporal full-resolution display becomes available.

Figure 18:
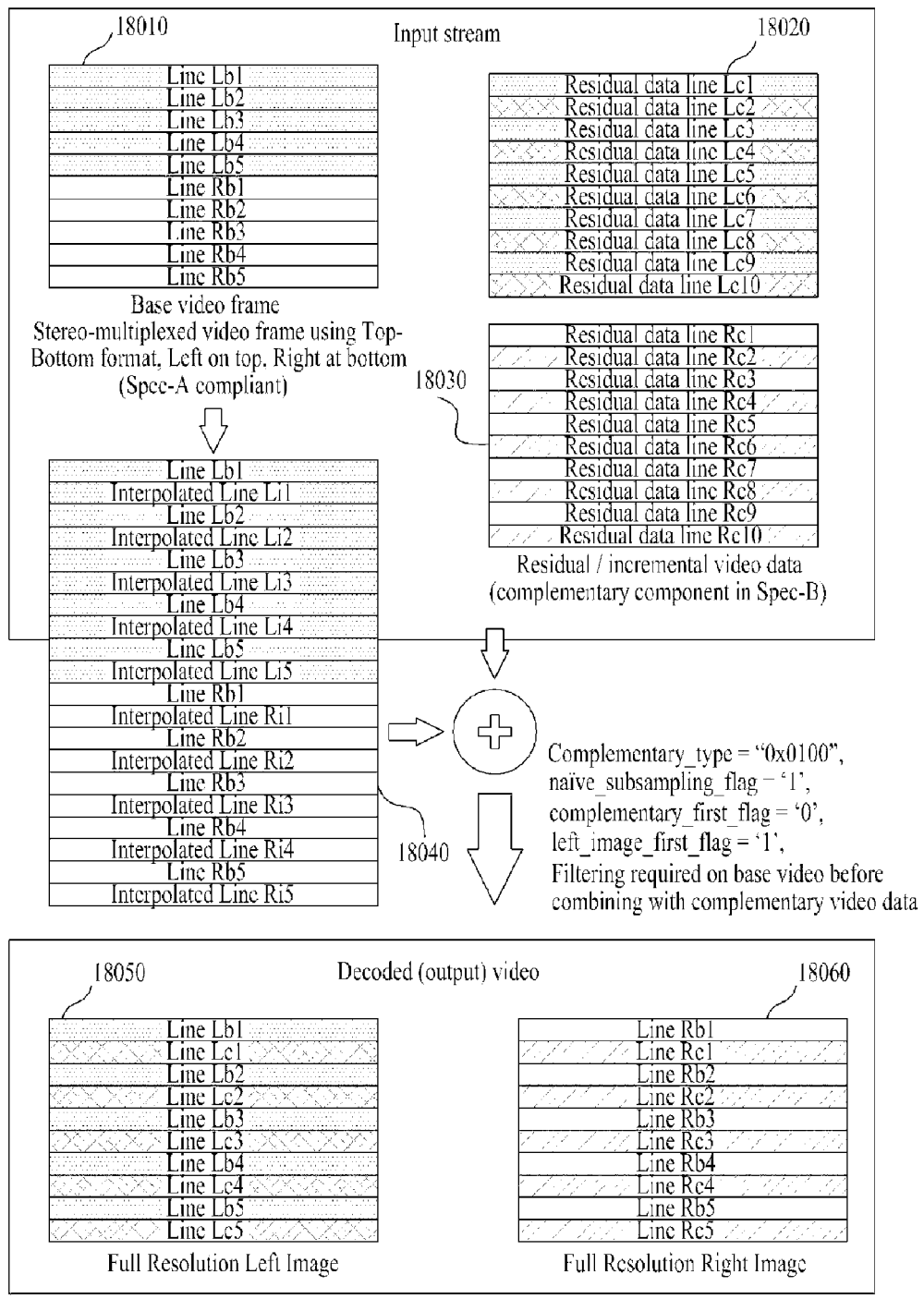
FIG. 18 illustrates a method for providing a full-resolution image using base video data, complementary video data, and 3D complementary video information received from a 3D video service Spec-B according to yet another embodiment of the present invention.

FIG. 18 illustrates a method for providing a full-resolution image using base video data, complementary video data, and 3D complementary video information received from a 3D video service Spec-B according to yet another embodiment of the present invention.

In the embodiment of FIG. 18, the image of the base video data is received in the top-bottom format, wherein the left image is positioned at the top side, and wherein the right image is positioned at the bottom side. In case of the 3D complementary video information, the field value of the complementary_type field is indicated as '0x0004', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data include residual video data with respect to the base video data (0x0004), that low-pass filtering and high-pass filtering are not performed when performing subsampling, that the video data corresponding to the left view is presented first, and that the video data corresponding to the base video precede the video data corresponding to the complementary video.

The receiving system performs line-by-line interpolation on the base video frame (18010), which is received first, thereby acquiring a spatially doubled video frame (18040). Thereafter, the receiving system combines the interpolated lines (Li1, Li2, . . . , Ri5) with the residual data lines (Lc1~Lc10 and Rc1~Rc10) of the complementary video frame (18020). Then, by positioning the combined lines line-by-line with the lines of the base video frame, a full-resolution left image (18050) and right image (18060) are acquired. According to an embodiment of the present invention, in case of the left image, line Li1 of the interpolated base video frame (18040) is combined with data of lines Lc1 and Lc2 of the complementary video frame (18020), thereby acquiring a line image Lc1 of the full-resolution image (18050). Subsequently, by using a method of positioning this line image Lc1 between line images Lb1 and Lb2, a full-resolution left image (18050) may be acquired.

The receiving system may display the acquired full-resolution left image (18050) and right image (18060) through a frame sequential scheme. In this case, since two frames (17050, 17060) are generated from one frame (18010) in frame units, temporal full-resolution display becomes available.

Figure 19:
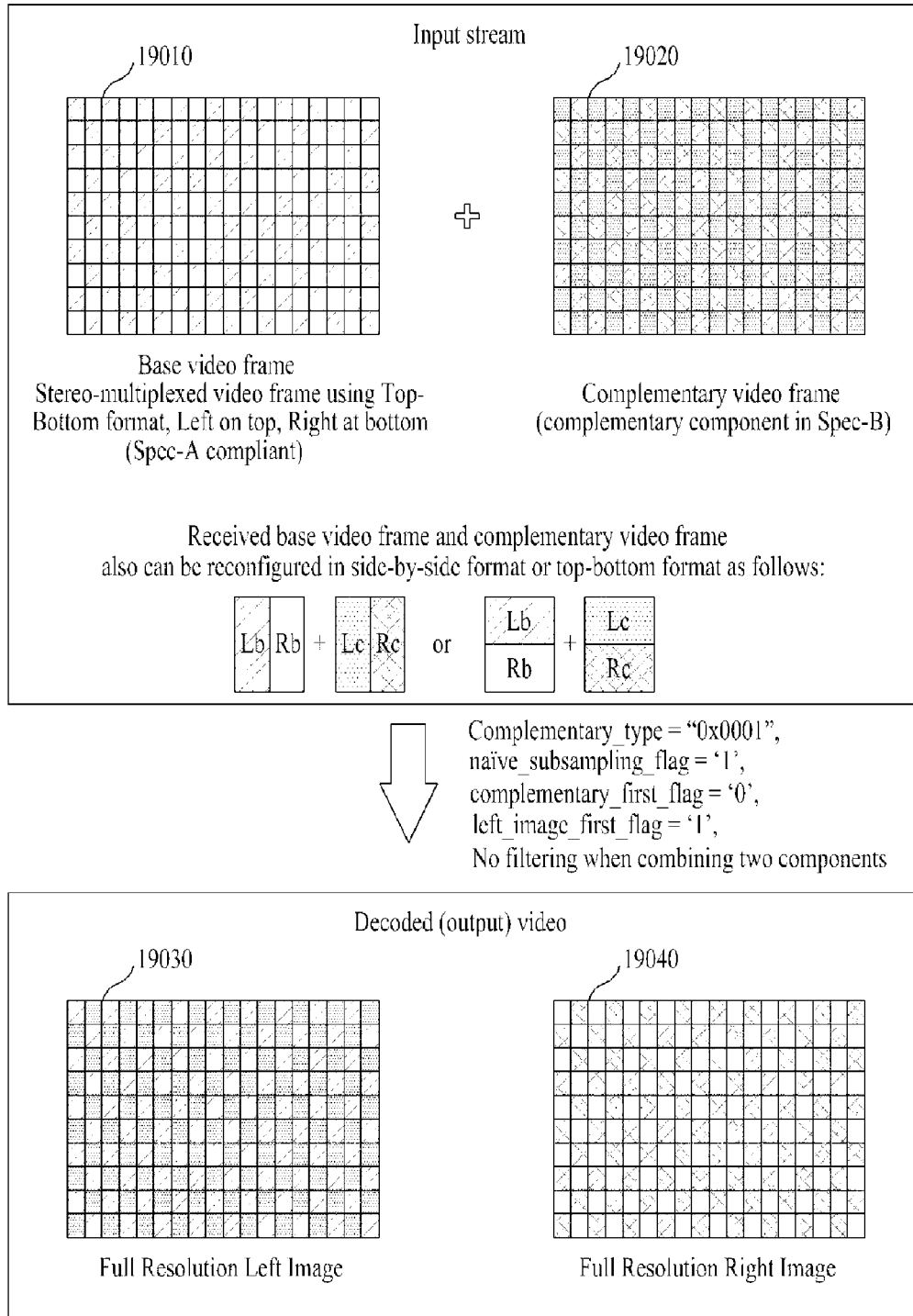
FIG. 19 illustrates a method for providing a full-resolution image using base video data, complementary video data, and 3D complementary video information received from a 3D video service Spec-B according to yet another embodiment of the present invention.

FIG. 19 illustrates a method for providing a full-resolution image using base video data, complementary video data, and 3D complementary video information received from a 3D video service Spec-B according to yet another embodiment of the present invention.

In the embodiment of FIG. 18, the image of the base video data is received in the checkerboard format, wherein the left image is positioned in an uppermost pixel of a left-end portion. In case of the 3D complementary video information, the field value of the complementary_type field is indicated as '0x0001', the field value of the naive_subsampling_flag field is indicated as '1', the field value of the left_image_first_flag field is indicated as '1', and the field value of the complementary_first_flag field is indicated as '0'. More specifically, the 3D complementary video information indicates that the complementary video data include a line-alternating order of the complementary video image for the base video image (0x0001), that low-pass filtering and high-pass filtering are not performed when performing subsampling, that the video data corresponding to the left view is presented first, and that the video data corresponding to the base video precede the video data corresponding to the complementary video.

The receiving system aligns pixels of a left view and pixels of a right view included in the received base video frame (19010) and aligns pixels of a left view and pixels of a right view included in the received complementary video frame (19020) for each line according to the respective order by using the 3D complementary video information. Thus, full-resolution left image (19030) and right image (19040) may be acquired. Also, according to an embodiment of the present invention, the receiving system reconfigures (or reconstructs) the received base video frame (19010) and complementary video frame (19020) in the side-by-side format or the top-bottom format. Then, the receiving system aligns the reconfigured video frames in accordance with the 3D complementary video information, thereby acquiring the full-resolution left image (19030) and right image (19040).

The receiving system may display the acquired full-resolution left image (19030) and right image (19040) through a frame sequential scheme. In this case, since two frames (19030, 19040) are generated from one frame (19010) in frame units, temporal full-resolution display becomes available.

The operation of the receiving system acquiring a full-resolution video component by combining a base video component and a complementary video component may be performed according to diverse embodiments in accordance with the above-described embodiments of the present invention.

According to an embodiment of the present invention, when the base video component is referred to as B, when the complementary video component is referred to as C, and when a full-resolution video component is referred to as F, the following operation scenario may be available.

case 1: F=B+C
case 2: F=B'+C
case 3: F=B'+C'

Herein, B' and C' respectively correspond to B and C being processed with interpolation/filtering.

case 1 corresponds to an example wherein the field value of the naive_subsampling_flag field is equal to '1'. Therefore, this case corresponds to an embodiment wherein two subsampled video component are interleaved and aligned.

case 2 corresponds to an example wherein B is processed with interpolation/filtering and then combined with C, thereby gaining F. Herein, C may correspond to a residual/incremental data format. (Particularly, when an SVC coding scheme is used, such form of combination may be performed.)

case 3 corresponds to an example wherein the field value of the naive_subsampling_flag field is equal to '0'. Therefore, this case corresponds to an embodiment wherein both B and C are processed with interpolation/filtering and wherein B' is combined with C', thereby gaining F.

Figure 20:
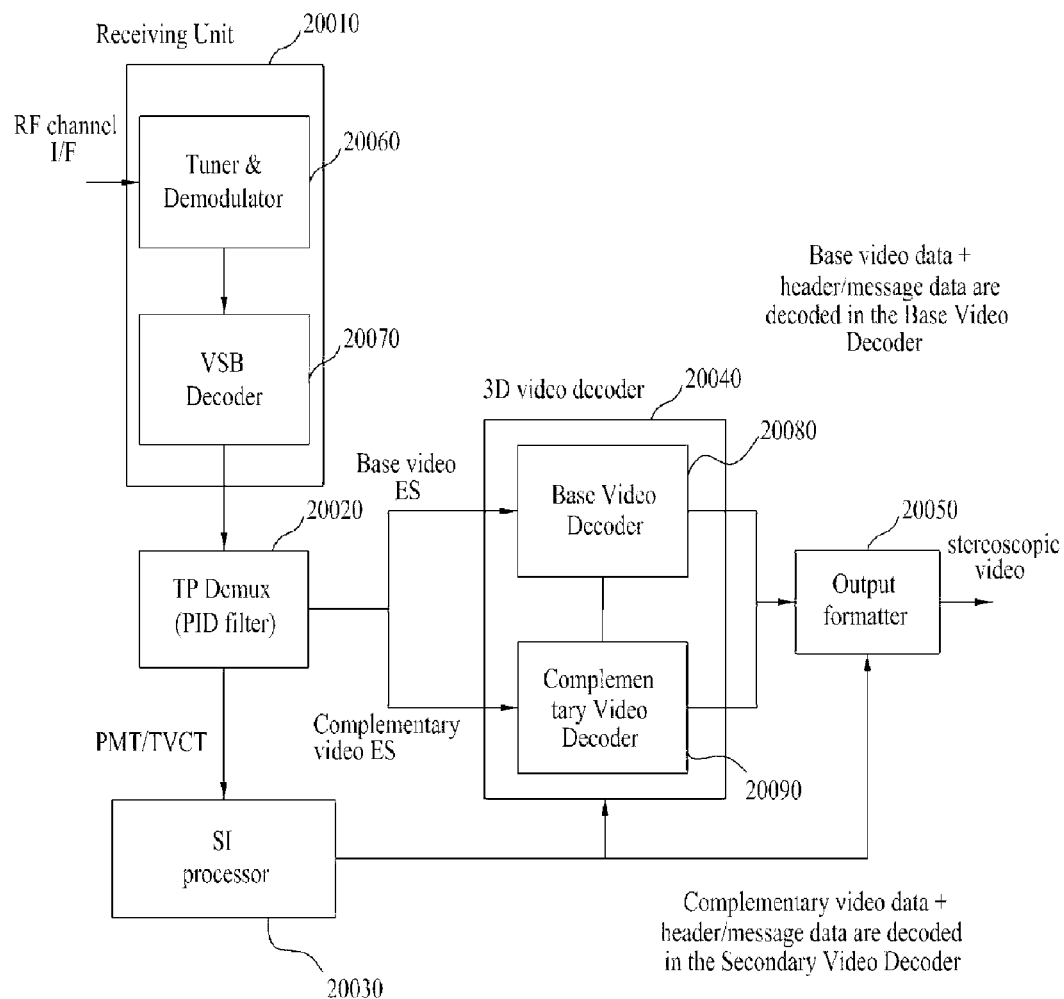
FIG. 20 illustrates a broadcast receiver according to an embodiment of the present invention.

FIG. 20 illustrates a broadcast receiver according to an embodiment of the present invention.

The broadcast receiver includes a receiving unit (20010) receiving a broadcast signal, a TP demultiplexer (20020) categorizing and extracting data based upon a PID of the received broadcast signal, an SI processor (20030) parsing and processing system information, a video decoder (20040) decoding video data, and an output formatter (20050) formatting the decoded video data. According to the embodiment of the present invention, the receiving unit (20010) may further include a tuner and demodulator (20060) and a VSB decoder (20070). And, the video decoder (20040) may further include a base video decoder (20080) decoding a base video ES and a complementary video decoder (20090) decoding a complementary video ES.

According to an embodiment of the present invention, when included in the PMT or VCT, the 3D complementary video information may be processed in the SI processor (20030) of the receiver, and when included in the video ES, the 3D complementary video information may be processed in the video decoder (20040). In the aspect of processing the 3D complementary video information, the SI processor (20030) and the video decoder (20040) may be referred to as a 3D complementary video information processing unit.

The operation of each element of the broadcast receiver will hereinafter be described in more detail with reference to the accompanying drawings.

FIG. 21 illustrates a flow chart showing a 3D video data processing method of a broadcast receiver according to an embodiment of the present invention.

The broadcast receiver receives a broadcast signal including 3D video data and 3D complementary video information by using a receiving unit (S21010). According to an embodiment of the present invention, the 3D video data may include base video data supporting half-resolution images, complementary video data added to the base video data for configuring full-resolution images, and 3D complementary video information for extracting and decoding the base video data and the complementary video data, thereby combining and formatting the processed data.

The broadcast receiver uses a 3D complementary video processing unit, so as to parse the 3D complementary video information included in the broadcast signal (S21020).

As described in FIG. 8 to FIG. 15, the 3D complementary video information may be included in the system information of the TVCT or PMT or may be included in the header information of the complementary video ES included in the complementary video data. The 3D complementary video information may include at least one of type information (complementary_type) indicating a configuration type of the complementary video data, subsampling information (naive_subsmapling_flag) indicating whether or not filtering is performed during subsampling, codec type information (codec_type) indicating the type of video codec used for encoding the complementary video data, horizontal size information (horizontal_size), vertical size information (vertical_size), frame rate information (frame_rate), filter information (interpolation_filter_available_flag) for implementing a filter used during an interpolation procedure, perspective information (left_image_flag_flag) indicating the image of which perspective is displayed first, and order information (complementary_first_flag) indicating a combination order of the base video data and the complementary video data.

The broadcast receiver uses the decoder to decode the half-resolution base video data (S21030). The base video data may be decoded by a base video decoder included in the decoder.

According to an embodiment of the present invention, the base video data and the complementary video data may be categorized by the TP demultiplexer based upon the PID, thereby being outputted to the decoder. Also, the base video data and the complementary video data may be outputted to the decoder as the 3D video data, and the decoder may categorize the base video data and the complementary video data based upon the header information of the video ES, thereby decoding the categorized video data.

The broadcast receiver uses the decoder to decode the complementary video data for configuring full-resolution images (S21040). The complementary video data may be decoded by a decoder included in the complementary video decoder.

The broadcast receiver uses the 3D complementary video information data to combine and format the base video data and the complementary video data from the output formatter, thereby outputting full-resolution 3D images (S21050).

The procedures of combining and formatting the full-resolution 3D images in the broadcast receiver may be performed using diverse methods depending upon the multiplexing format of the base video data and the type of the complementary video data. Also, such combining and formatting operations may be performed as described in FIG. 4 to FIG. 7 and FIG. 16 to FIG. 19. The full-resolution 3D image may be outputted as a spatially full-resolution 3D image and may also be implemented at a frame rate temporally twice the rate of a half-resolution image, thereby being outputted as a full-resolution image.

Hereinafter, the operations of the broadcast receiver will be described in more detail with reference to when the 3D complementary video information is included in the TVCT, when the 3D complementary video information is included in the PMT, and when the 3D complementary video information is included in the header information of the video ES.

Regarding the detailed description presented below, in case a half-resolution 3DTV broadcast service is being provided, it is assumed that information on the half-resolution 3D broadcast service and the respective video data (base video data) is signaled through at least one of the TVCT, PMT, and the video ES. Therefore, the broadcast receiver may determine information on the base video data by using stream_type information associated to the base video data or by using a separate descriptor, and such information may also be referred to as 3D base video information.

(1) when 3D complementary video information is received in the TVCT

The broadcast receiver uses a service_type field of the TVCT to determine whether or not a full-resolution 3DTV broadcast service is being provided by a respective virtual channel.

When the full-resolution 3DTV broadcast service is being provided, the broadcast receiver first uses the 3D base video information so as to acquire an elementary_PID information (PID_B) corresponding to the base video data or the base video component. Then, the broadcast receiver uses the 3D complementary video information so as to acquire an elementary_PID information (PID_C) corresponding to the complementary video data or the complementary video component.

The broadcast receiver decodes the base video component corresponding to the PID_B and decodes the complementary video component corresponding to the PID_C.

The broadcast receiver uses at least one of the complementary_type field, the naive_subsmapling_flag field, the codec_type field, the horizontal_size field, the vertical_size field, the frame_rate field, the interpolation_filter_available_flag field, the left_image_flag_flag field, and the complementary_first_flag field included in the 3D complementary video information (or 3D complementary video descriptor, so as to combine the base video data and the complementary video data, thereby acquiring full-resolution left image and right image.

The broadcast receiver outputs the acquired left image and right image for display, thereby providing a full-resolution 3D image to the user.

(2) when 3D complementary video information is received in the PMT

Among the ES signaled by the PMT, the broadcast receiver determines the existence of a data stream corresponding to half-resolution video data. The broadcast receiver uses the 3D base video information to acknowledge that the corresponding ES (PID_B) includes video data having half-resolution left image and right image multiplexed therein.

Among the ES signaled by the PMT, the broadcast receiver determines the existence of a data stream of a stream corresponding to the complementary video data. The broadcast receiver may use the 3D complementary video information so as to perform the determination process, or may use the stream_type field so as to acknowledge that the corresponding ES (PID_C) includes complementary video data for configuring a full-resolution image.

The broadcast receiver uses the program_number field to perform mapping with the information being provided through the TVCT, and the broadcast receiver determines through which virtual channel this program is being provided.

The broadcast receiver decodes the base video component corresponding to the PID_B and decodes the complementary video component corresponding to the PID_C.

The broadcast receiver uses at least one of the complementary_type field, the naive_subsmapling_flag field, the codec_type field, the horizontal_size field, the vertical_size field, the frame_rate field, the interpolation_filter_available_flag field, the left_image_flag_flag field, and the complementary_first_flag field included in the 3D complementary video information (or 3D complementary video descriptor, so as to combine the base video data and the complementary video data, thereby acquiring full-resolution left image and right image.

The broadcast receiver outputs the acquired left image and right image for display, thereby providing a full-resolution 3D image to the user.

(3) header information (or SEI message) of video ES

Among the ES signaled by the PMT, the broadcast receiver determines the existence of a data stream corresponding to half-resolution video data. The broadcast receiver uses the 3D base video information to acknowledge that the corresponding ES (PID_B) includes video data having half-resolution left image and right image multiplexed therein.

Among the ES signaled by the PMT, the broadcast receiver determines the existence of a data stream of a stream corresponding to the complementary video data. The broadcast receiver may determine the existence (or presence) of the 3D complementary video information, or may use the stream_type field so as to acknowledge that the corresponding ES (PID_C) includes complementary video data for configuring a full-resolution image.

The broadcast receiver decodes the base video component corresponding to the PID_B. And, the broadcast receiver decodes the complementary video component corresponding to the PID_C. At this point, the ES of the complementary video component detects and parses 3D complementary video information (complementary_video_info) included in the SEI message with respect to the Picture extension and user data or Picture/Sequence.

The broadcast receiver uses at least one of the complementary_type field, the codec_type field, the naive_subsmapling_flag field, the horizontal_size field, the vertical_size field, the frame_rate field, the interpolation_filter_available_flag field, the left_image_flag_flag field, and the complementary_first_flag field included in the 3D complementary video information (or 3D complementary video descriptor, so as to combine the base video data and the complementary video data, thereby acquiring full-resolution left image and right image.

The broadcast receiver outputs the acquired left image and right image for display, thereby providing a full-resolution 3D image to the user.

The method invention according to the present invention may be implemented in program command formats that can all be executed by a variety of computer means, thereby being recorded (or written) in a computer-readable medium. The computer-readable medium may include a program command, a data file, a data structure, and so on, either individually or in combination. The program command being written in the medium may either be specifically designed and configured for the present invention or may be disclosed to anyone skilled in the field of computer software, so as to be used. Examples of the computer-readable medium may include magnetic media such as a hard disk, a floppy disk, and a magnetic tape, optical media such as a CD-ROM and DVD, magneto-optical media such as a floptical disk, and hardware specifically designed for storing and executing program commands such as ROM, RAM, and flash memories. Examples of the program command may include machine language code that is created by a compiler, as well as a high-level language code that can be executed by using an interpreter. The above-described hardware device may be configured to be operated as at least one or more software modules for performing the operations of the present invention, and such configuration may also be inverted.

As described above, although the present invention has been described with reference to limited embodiments and drawings, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR THE INVENTION

As described above, the related details have been described in the best mode for carrying out the present invention.

INDUSTRIAL APPLICABILITY

As described above, the present invention may be applied entirely or partially to a digital broadcasting system.

The invention claimed is:

1. A 3D video data processing method of a broadcast receiver, comprising:
    receiving, by a receiving unit, 3D video data which corresponds to half-resolution video data for a 3D content via a base layer, complementary video data for configuring a full-resolution image for the 3D content via an enhancement layer, and 3D complementary video information,
    wherein the 3D complementary video information includes complementary type information indicating a configuration type of the complementary video data and order information indicating a combination order of the half-resolution video data and the complementary video data;
    parsing, by a 3D video information processing unit, the 3D complementary video information;
    decoding, by a base video decoder, the half-resolution video data;
    decoding, by a complementary video decoder, the complementary video data for configuring a full-resolution image; and
    combining and formatting, by an output formatter, the half-resolution video data and the complementary video data using the complementary type information and the order information, thereby outputting a full-resolution 3D image.

2. The method of claim 1, wherein the 3D complementary video information is included in a Program Map Table (PMT) or Terrestrial Virtual Channel Table (TVCT).

3. The method of claim 1, wherein the 3D complementary video information is included in header information of a video Elementary Stream (ES) of the complementary video data.

4. The method of claim 1, wherein the 3D complementary video information includes at least one of subsampling information indicating whether or not filtering is performed during subsampling, codec type information indicating the type of video codec used for encoding the complementary video data, horizontal size information, vertical size information, frame rate information, filter information for implementing a filter used during an interpolation procedure, and perspective information indicating the image of which perspective is displayed first.

5. The method of claim 1, wherein the full-resolution image is temporally and spatially in full-resolution.

6. A broadcast receiver, comprising:
    a receiving unit receiving 3D video data which corresponds to half-resolution video data for a 3D content via a base layer, complementary video data for configuring a full-resolution image for the 3D content via an enhancement layer, and 3D complementary video information,
    wherein the 3D complementary video information includes complementary type information indicating a configuration type of the complementary video data and order information indicating a combination order of the half-resolution video data and the complementary video data;
    a 3D video information processing unit parsing the 3D complementary video information;
    a base video decoder decoding the half-resolution video data;
    a complementary video decoder decoding the complementary video data for configuring a full-resolution image; and
    an output formatter combining and formatting the half-resolution video data and the complementary video data using the complementary type information and the order information, thereby outputting a full-resolution 3D image.

7. The broadcast receiver of claim 6, wherein the 3D complementary video information is included in a Program Map Table (PMT) or Terrestrial Virtual Channel Table (TVCT).

8. The broadcast receiver of claim 6, wherein the 3D complementary video information is included in header information of a video Elementary Stream (ES) of the complementary video data.

9. The broadcast receiver of claim 6, wherein the 3D complementary video information includes at least one of subsampling information indicating whether or not filtering is performed during subsampling, codec type information indicating the type of video codec used for encoding the complementary video data, horizontal size information, vertical size information, frame rate information, filter information for implementing a filter used during an interpolation procedure, and perspective information indicating the image of which perspective is displayed first.

10. The broadcast receiver of claim 6, wherein the full-resolution image is temporally and spatially in full-resolution.

* * * * *